(12) United States Patent
Gardner et al.

(10) Patent No.: US 10,480,824 B2
(45) Date of Patent: Nov. 19, 2019

(54) LEAK DETECTION SENSOR ASSEMBLIES FOR WATER HEATERS

(71) Applicant: Rheem Manufacturing Company, Atlanta, GA (US)

(72) Inventors: Joseph D. Gardner, Montgomery, AL (US); Jozef Boros, Montgomery, AL (US); Timothy D. Scott, Tallassee, AL (US); William J. Hall, Prattville, AL (US); Raheel A. Chaudhry, Montgomery, AL (US); Gregory M. Welk, Prattville, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 0 days.

(21) Appl. No.: 15/811,187

(22) Filed: Nov. 13, 2017

(65) Prior Publication Data

US 2019/0145661 A1    May 16, 2019

(51) Int. Cl.
*F24H 9/20* (2006.01)
*G01F 23/00* (2006.01)
*E03B 7/07* (2006.01)
*F24H 9/16* (2006.01)
*G01M 3/16* (2006.01)

(52) U.S. Cl.
CPC .......... *F24H 9/2007* (2013.01); *F24H 9/165* (2013.01); *G01F 23/00* (2013.01); *G01M 3/165* (2013.01); *E03B 7/071* (2013.01)

(58) Field of Classification Search
CPC .... F24H 9/2007; F24H 9/165; G01M 3/3245; G01F 23/00; E03B 7/071
See application file for complete search history.

(56) References Cited

U.S. PATENT DOCUMENTS

| | | | | |
|---|---|---|---|---|
| 3,069,671 | A * | 12/1962 | Taylor | F24H 9/165 122/13.01 |
| 4,085,773 | A | 4/1978 | Tinney | |
| 5,006,302 | A * | 4/1991 | Trundle | F22B 37/003 376/260 |
| 5,134,683 | A | 7/1992 | Powell | |
| 5,315,291 | A * | 5/1994 | Furr | G01M 3/16 200/61.05 |
| 6,135,133 | A * | 10/2000 | Ridgeway, Jr. | F24H 9/165 122/504.2 |
| 6,253,785 | B1 * | 7/2001 | Shumake, Jr. | F16K 21/18 122/504 |
| 6,997,207 | B2 | 2/2006 | McKesson | |
| 7,421,784 | B2 | 9/2008 | Akkala et al. | |

(Continued)

*Primary Examiner* — Steven S Anderson, II
(74) *Attorney, Agent, or Firm* — King & Spalding LLP

(57) ABSTRACT

A water heater includes a leak detection system. The leak detection system includes a leak sensor assembly that is disposed in a bottom pan of the water heater. The leak sensor assembly includes a sensor housing that has a sensor channel that is formed therein such that the sensor channel is disposed at an elevation from a base of the bottom pan when the sensor housing is disposed on the base of the bottom pan. Further, the leak sensor assembly includes a leak sensor that is disposed in the sensor channel of the sensor housing. The leak sensor detects water that leaks from the water heater and accumulates in the bottom pan when a level of the water in the bottom pan rises to the elevation of the sensor channel and the leak sensor that is disposed therein.

14 Claims, 29 Drawing Sheets

(56) References Cited

U.S. PATENT DOCUMENTS

| | | | |
|---|---|---|---|
| 2009/0140866 A1* | 6/2009 | Heilmann | G01M 3/186 340/605 |
| 2010/0302047 A1* | 12/2010 | Wood | G01M 3/16 340/605 |
| 2014/0158697 A1 | 6/2014 | Tarr et al. | |
| 2017/0363501 A1* | 12/2017 | Franz | G01M 3/16 |

* cited by examiner

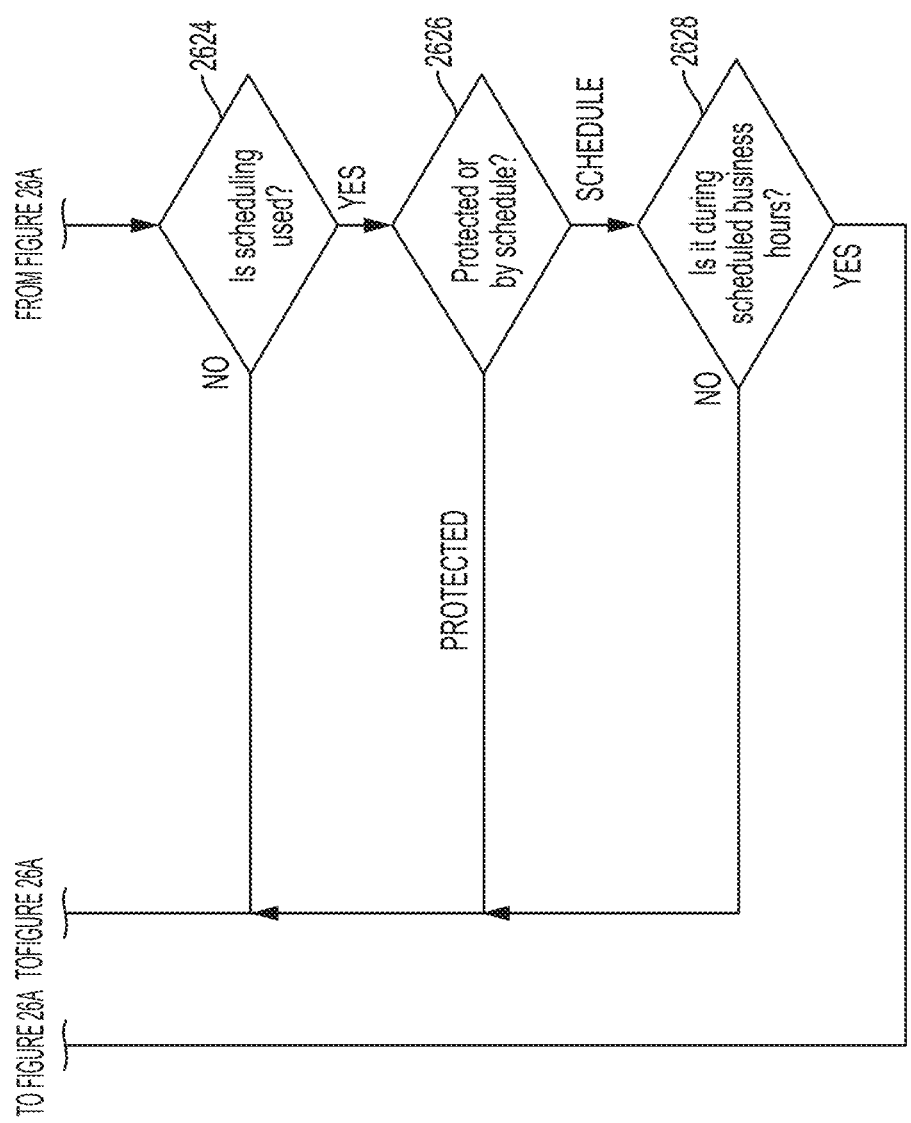

LEAK DETECTION SENSOR ASSEMBLIES FOR WATER HEATERS

TECHNICAL FIELD

The present disclosure relates generally to water heaters, and more particularly to a leak detection system in water heaters.

BACKGROUND

A water heater may be subject to deterioration over the course of its life. Such deterioration may compromise the integrity of the water heater and may cause water that is stored in a storage tank of the water heater to leak. For example, the water may leak from the storage tank of the water heater onto a drain pan on which the water heater is disposed. In another example, the water may leak from fittings or couplings of the water heater onto an outer jacket surrounding the storage tank assembly of the water heater. In yet another example, the water may leak from the storage tank into a cavity in between the storage tank and the outer jacket of the water heater. In the latter example, the water that collects in the cavity may escape to an external surface of the water heater's outer jacket. The water that leaks from the water heater may eventually pool at the base of the water heater. If left undetected and unattended, such leaks may result in damage to furniture, electrical equipment, the water heater itself, and/or other property, which in turn may result in costly repairs. Further, these leaks can create a hazardous working environment for persons in the vicinity of the leak.

Existing leak detection systems may be configured to detect a leak condition, i.e., a water leak, in the water heater. However, the existing leak detection systems are typically provided as a separate accessory that a person must manually install on site. If the person fails to install the leak detection system or installs the leak detection system incorrectly, the leak sensing capability of the water heater is negated. Further, existing leak detection systems may not be configured to prevent the detection of water that does not result from a leak condition, e.g., from condensation during normal operation, thereby causing false positive detections and triggering false alarms. Furthermore, existing leak detection systems may not be configured for easy access and replicability of the leak sensors of the leak detection systems.

In light of the above mentioned shortcomings of the conventional water heaters, there is a need for an improved leak detection system in water heaters. Further, this background information is provided to reveal information believed by the applicant to be of possible relevance to the present disclosure. No admission is necessarily intended, nor should be construed, that any of the preceding information constitutes prior art against the present disclosure.

SUMMARY

In one aspect, the present disclosure is related to a water heater that includes a bottom pan. The bottom pan includes a base and a sidewall disposed along a perimeter of the base. Further, the water heater includes a leak sensor assembly that is configured to detect water that leaks from the water heater. The leak sensor assembly includes a sensor housing that comprises a sensor channel that is formed therein such that the sensor channel is disposed at an elevation from the base of the bottom pan when the sensor housing is disposed on the base of the bottom pan. Further, the leak sensor assembly includes a leak sensor that is disposed in the sensor channel of the sensor housing. The water heater includes a shut-off valve that is configured to control a flow of the water into a storage tank of the water heater. Furthermore, the water heater includes a controller that is coupled to the leak sensor and configured to control the shut-off valve. Responsive to receiving a signal from the leak sensor that the leak sensor has detected water, the controller is configured to: (a) close the shut-off valve during a first mode of operation, and (b) send a query to a computing device of a user associated with the water heater and close the shut-off valve based on an input from the user during a second mode of operation.

In another aspect, the present disclosure is related to a leak detection system that includes a leak sensor assembly that is configured to be disposed in a reservoir associated with a water heater. The leak sensor assembly is configured to detect water that leaks from the water heater and accumulates in the reservoir. The leak sensor assembly includes a sensor housing that comprises a sensor channel that is formed therein such that the sensor channel is disposed at an elevation when the sensor housing is disposed in the reservoir. Further, the leak sensor assembly includes a leak sensor that is disposed in the sensor channel of the sensor housing and configured to detect the water that leaks from the water heater when the water collected in the reservoir rises to the elevation at which the leak sensor is disposed in the sensor channel.

In yet another aspect, the present disclosure is related to a leak detection system that includes a leak sensor assembly that is configured to be disposed in a bottom pan of a water heater. The leak sensor assembly is configured to detect water that leaks from the water heater and accumulates in the bottom pan. The leak sensor assembly includes a sensor housing that comprises a sensor channel that is formed therein such that the sensor channel is disposed at an elevation from a base of the bottom pan when the sensor housing is disposed on the base of the bottom pan. Further, the leak sensor assembly includes a leak sensor that is disposed in the sensor channel of the sensor housing.

These and other aspects, objects, features, and embodiments, will be apparent from the following description and the appended claims.

BRIEF DESCRIPTION OF THE FIGURES

The foregoing and other features and aspects of the present disclosure are best understood with reference to the following description of certain example embodiments, when read in conjunction with the accompanying drawings, wherein:

FIGS. 26A and 26B (collectively "FIG. 26") are a flowchart that illustrates an example operation of a controller of the water heater, in accordance with example embodiments of the present disclosure.

Figure 1:
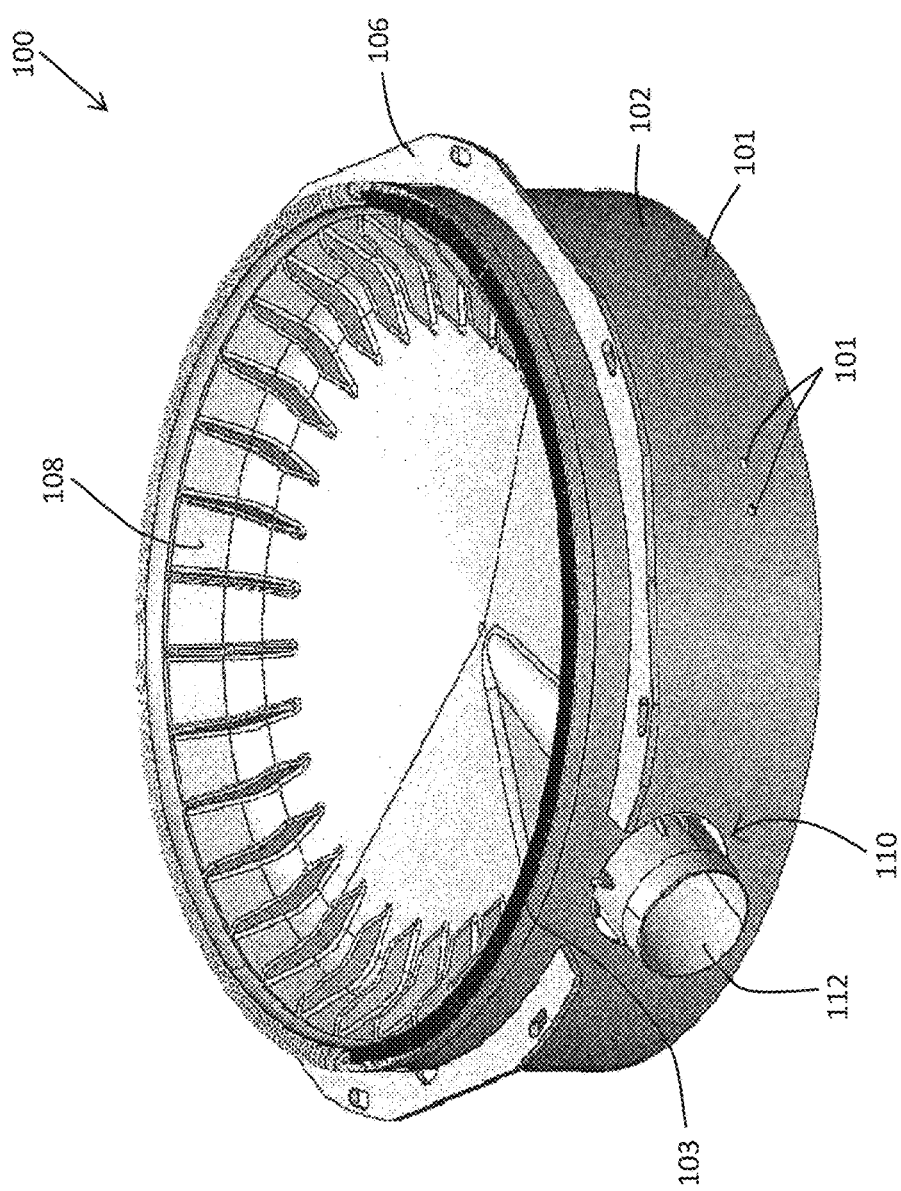
FIG. 1 illustrates a skirt-ring assembly of a water heater with a flue gas collector and exhaust pan disposed on the skirt-ring assembly, in accordance with example embodiments of the present disclosure.

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles.

In the foregoing figures showing example embodiments of water heaters with the leak detection system, one or more of the components shown may be omitted, repeated, and/or substituted. Accordingly, the example embodiments of water heaters should not be considered limited to the specific arrangements of components shown in any of the figures. For example, features shown in one or more figures or described with respect to one embodiment can be applied to another embodiment associated with a different figure or description.

DETAILED DESCRIPTION OF EXAMPLE EMBODIMENTS

The present disclosure describes a water heater with a leak detection system that includes a leak sensor assembly disposed in a bottom pan of the water heater, where the leak sensor assembly is configured to detect water that leaks from the water heater. The leak sensor assembly has a sensor housing and a leak sensor. The sensor housing includes a sensor channel that is formed therein to receive or house the leak sensor.

In particular, the sensor channel is formed in the sensor housing such that the sensor channel is disposed at an elevation above the base of the bottom pan when the sensor housing is disposed in the bottom pan. The elevation of the sensor channel above the base of the bottom pan ensures that water accumulating from a leak triggers the leak sensor disposed in the sensor channel only when the water level rises inside the bottom pan of the water heater to the elevation of the sensor channel. That is, a small amount water that drips into the bottom pan from normal operation of the water heater (e.g. from condensation) may not trigger the leak sensor of the leak sensor assembly. The distance by which the channel is elevated from the base of the bottom pan determines the amount of water that needs to collect in the bottom pan before a leak is detected. Further, the sensor channel that is formed in the sensor housing is shielded from above to prevent any water that does not result from a leak, e.g., condensation, from dripping onto a leak sensor from above and falsely triggering the leak sensor.

Additionally, the bottom pan of the water heater may include channeling mechanisms that are configured to receive and direct water that leaks from the outer jacket and/or fittings of the water heater towards the base of the bottom pan where the leak sensor assembly is disposed.

Example embodiments of the water heater with the leak detection system will be described more fully hereinafter with reference to the accompanying drawings that describe representative embodiments of the present technology. If a component of a figure is described but not expressly shown or labeled in that figure, the label used for a corresponding component in another figure can be inferred to that component. Conversely, if a component in a figure is labeled but not described, the description for such component can be substantially the same as the description for a corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

The technology of the water heater with the leak detection system may be embodied in many different forms and should not be construed as being limited to the embodiments set forth herein; rather, these embodiments are provided so that this disclosure will be thorough and complete, and will fully convey the scope of the technology to those appropriately skilled in the art. Further, example embodiments of the present disclosure can be used for any size (e.g., capacity) of water heater. Furthermore, example embodiments of the present disclosure can be located in any type of environment (e.g., warehouse, attic, garage, storage, mechanical room, basement) for any type (e.g., commercial, residential, industrial) of user. Water heaters used with example embodiments can include both electric and/or fuel fired water heaters that can be used for one or more of any number of processes (e.g., automatic clothes washers, automatic dishwashers, showers, sink faucets, heating systems, humidifiers).

Water heater systems (or components thereof, including controllers) described herein can be made of one or more of a number of suitable materials to allow that device and/or other associated components of a system to meet certain standards and/or regulations while also maintaining durability in light of the one or more conditions under which the devices and/or other associated components of the system can be exposed. Examples of such materials can include, but are not limited to, aluminum, stainless steel, copper, fiberglass, glass, plastic, PVC, ceramic, and rubber.

Further, components of a water heater system (or portions thereof) described herein can be made from a single piece (as from a mold, injection mold, die cast, or extrusion process). In addition, or in the alternative, components of a water heater system (or portions thereof) can be made from multiple pieces that are mechanically coupled to each other. In such a case, the multiple pieces can be mechanically coupled to each other using one or more of a number of coupling methods, including but not limited to epoxy, welding, soldering, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Terms such as "first", "second", "third", "top", "bottom", "side", and "within" are used merely to distinguish one component (or part of a component or state of a component) from another. Such terms are not meant to denote a preference or a particular orientation, and are not meant to limit embodiments of water heaters with leak detection systems. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Turning now to the figures, example embodiments of a water heater with the leak detection system will be described in connection with FIGS. 1-27. In particular, a portion of the water heater including, inter alia, the bottom pan and the skirt-ring assembly will be described in connection with FIGS. 1-3 and 25. Additional reference may also be made to FIGS. 15 and 19 as necessary when describing the portion of the water heater in connection with FIGS. 1-3 and 25. Further, a water heater with a first example leak sensor assembly will be described in connection with FIGS. 4-8; a water heater with a second example leak sensor assembly will be described in connection with FIGS. 9-13; a water heater with a third example leak sensor assembly will be described in connection with FIGS. 14-19; a water heater with a fourth example leak sensor assembly will be described in connection with FIGS. 20-22; a fifth example leak sensor assembly will be described in connection with FIGS. 23-24; and an example operation of the controller of the water heater will be described in connection with FIG. 26.

Water Heater and Bottom Pan with Channeling Mechanism

As illustrated in FIGS. 1-3 and 25, an example water heater may include a bottom pan 200 that has a base 202 and a sidewall 206 that extends substantially perpendicular to the base 202 from a perimeter 207 of the base 202. Further, the bottom pan 200 may include two feet members 212 that are disposed below the base 202 such that they elevate the base 202 of the bottom pan 200 from a mounting surface, e.g., a floor, when the bottom pan 200 is disposed on the mounting surface.

Furthermore, the bottom pan 200 may include an annular channeling member 204 that is configured to direct water that leaks from the water heater, e.g., from an outer jacket 1520 (shown in FIG. 15) of the water heater, towards the base 202 of bottom pan 200 where a leak sensor assembly (408, 908, 1402, 2002, and/or 2302) (shown in FIGS. 4, 9, 14, 20, and 23) of the water heater may be disposed. The water that leaks from the outer jacket 1520 may be directed to the base 202 of the bottom pan 200 through a gap 1591 (shown in FIG. 15) between the outer jacket 1520 and the sidewall 206 of the bottom pan 200 or through an exhaust opening 1902 (shown in FIG. 19) in the outer jacket 1520.

Figure 25:
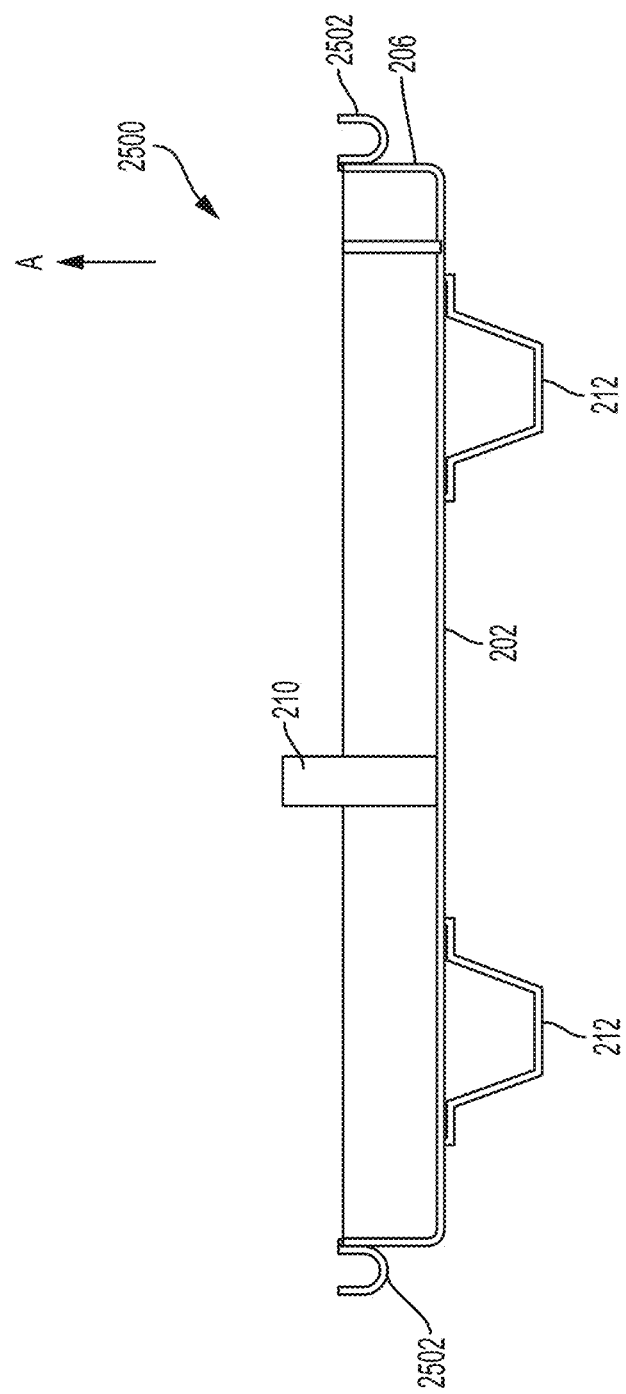
FIG. 25 illustrates an example channeling mechanism that is integral with the bottom pan for channeling water that leaks from the water heater to the leak sensor assembly of the water heater.

The channeling member 204 may be integrally formed with (built into) the sidewall 206 of the bottom pan 200 or attached the sidewall 206 of the bottom pan 200. In particular, the channeling member 204 may be disposed adjacent a top edge 209 of the sidewall 206 of the bottom pan 200 such that the channeling member 204 extends radially outward and away from the top edge 209 of the sidewall 206 of the bottom pan 200. In one example embodiment, the channeling member 204 may have a flared geometry as illustrated at least in FIGS. 2 and 3 where the channeling member 204 extends at an angle upwards and away from the top edge 209 of the sidewall 206. However, in other example embodiments, the channeling member 204 may have any other appropriate shape that enables it to collect and direct water that leaks from the water heater towards the base of the bottom pan without departing from a broader scope of the present disclosure. For example, the channeling member 2502 may have a C-shaped cross-sectional profile with an open end of the channeling member 2502 facing upwards (direction A) as illustrated in FIG. 25. Alternatively, in another example, the channeling member 204 may have a L-shaped cross-sectional profile.

Figure 2:
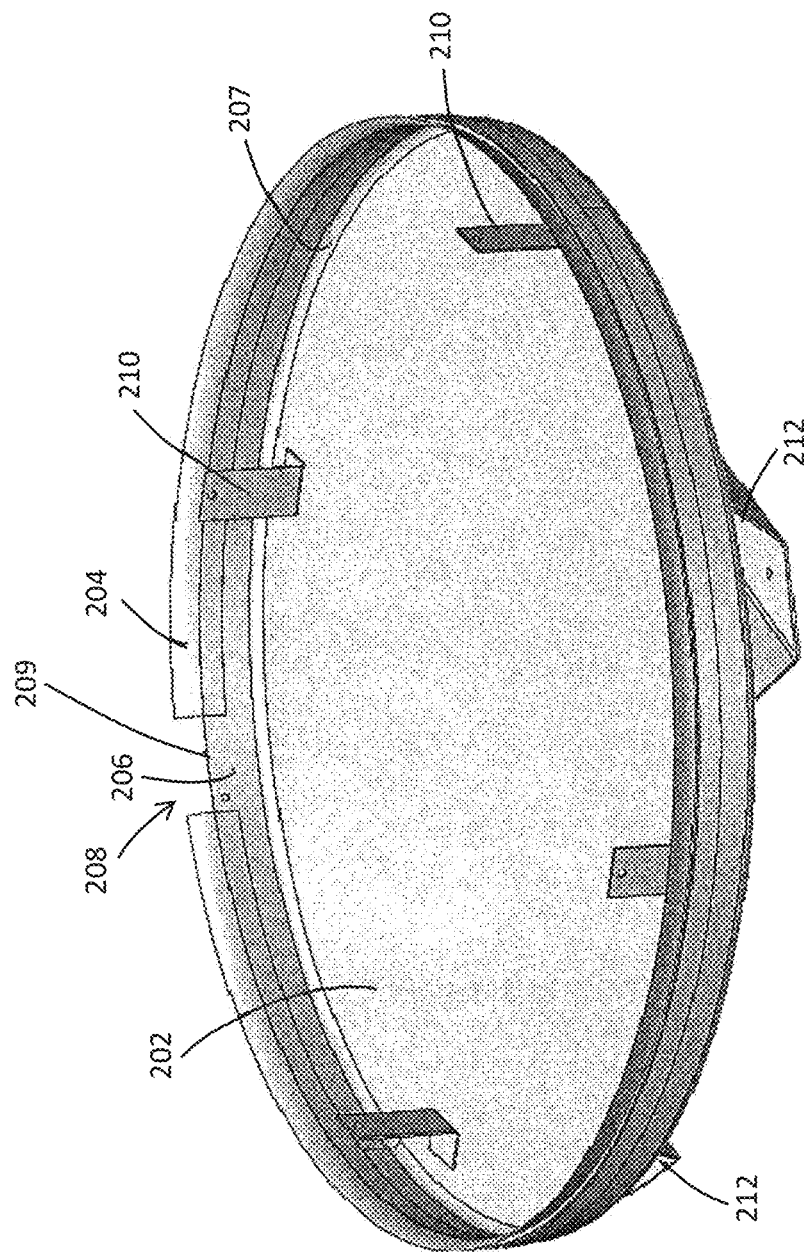
FIG. 2 illustrates a bottom pan of the water heater, in accordance with example embodiments of the present disclosure.
Figure 3:
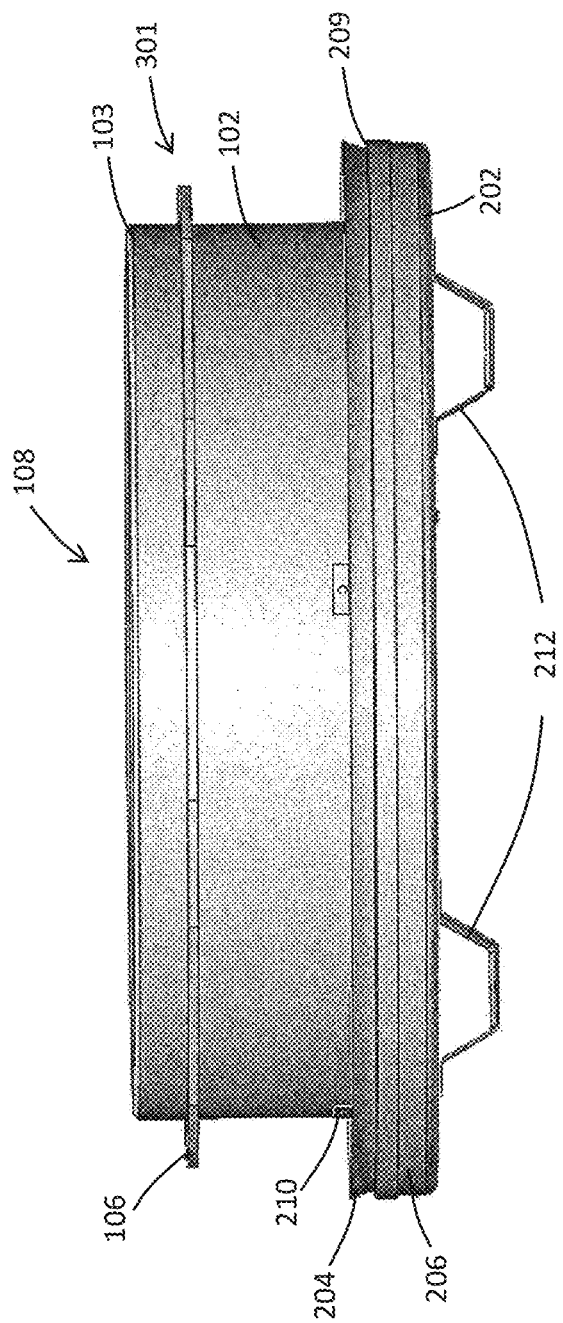
FIG. 3 illustrates a side view of a support assembly of the water heater comprising the bottom pan of FIG. 2 and the skirt-ring assembly of FIG. 1 disposed therein, in accordance with example embodiments of the present disclosure.

It is noted that even though FIGS. 1-3 and 25, illustrate the base 202 of the bottom pan 200 as being substantially circular in shape, one of ordinary skill in the art can understand and appreciate that in other example embodiments, the base of the bottom pan can have any other appropriate shape without departing from a broader scope of the present disclosure. Further, even though FIG. 2 illustrates the channeling member 204 as extending only partially along the sidewall 206 of the bottom pan 200 and leaving an opening 208 between the two ends of the channeling member 204, one of ordinary skill in the art can understand and appreciate that in other example embodiments, the channeling member may circumferentially extend along the sidewall of the bottom pan without departing from a broader scope of the present disclosure. Furthermore, even though the present disclosure describes the channeling member 204 as being configured to collect and direct water that leaks from the outer jacket 1520 of the water heater, one of ordinary skill in the art can understand and appreciate that in other example embodiments, the geometry of the channeling member may be extended such that water dripping from any fitting of the water heater may also be collected by the channeling member and directed towards the leak sensor assembly disposed in the base of the bottom pan without departing from a broader scope of the present disclosure. Additionally, even though the present disclosure describes the bottom pan as having two feet members, one of ordinary skill in the art can understand and appreciate that in other example embodiments, the bottom pan may have fewer or more feet members, e.g. one foot member, three feet members, etc., without departing from a broader scope of the present disclosure.

In addition to the bottom pan 200, the water heater may include a storage tank 1522 (shown in FIG. 15) and/or an outer jacket 1520 (shown in FIG. 15) that are received and supported by the bottom pan 200. In particular, the storage tank 1522 may be mounted on a skirt-ring assembly 301 (shown in FIG. 3) of the water heater that is disposed in the bottom pan 200. The skirt-ring assembly 301 may include an annular skirt wall 102 that is substantially cylindrical in shape and that extends from a top edge 103 to a bottom edge 101. Further, the skirt wall 102 may include one or more exhaust openings 110, 1408 formed therein. The skirt wall 102 may have a smaller diameter than the base 202 of the bottom pan 200 and may be disposed on the base 202 of the bottom pan 200 within the sidewall 206 of the bottom pan 200. In particular, the skirt wall 102 may be disposed between the coupling tabs 210 disposed in the base 202 of the bottom pan 200. The coupling apertures 104 of the skirt wall 102 may be aligned with corresponding openings in the coupling tabs 210 of the bottom pan 200, and may be configured to receive fasteners therethrough to couple and securely retain the skirt wall 102 to the bottom pan 200. The coupling tabs 210 of the bottom pan 200 may also be used to align the skirt wall 102 within the bottom pan 200. Further, the skirt-ring assembly may include a ring 106 that is disposed adjacent the top edge 103 of the skirt wall 102 and extends radially outward from the skirt wall 102. The ring 106 may be configured to receive and couple a bottom flange 1528 (shown in FIG. 15) of the storage tank 1522 to the skirt-ring assembly 301.

Figure 15:
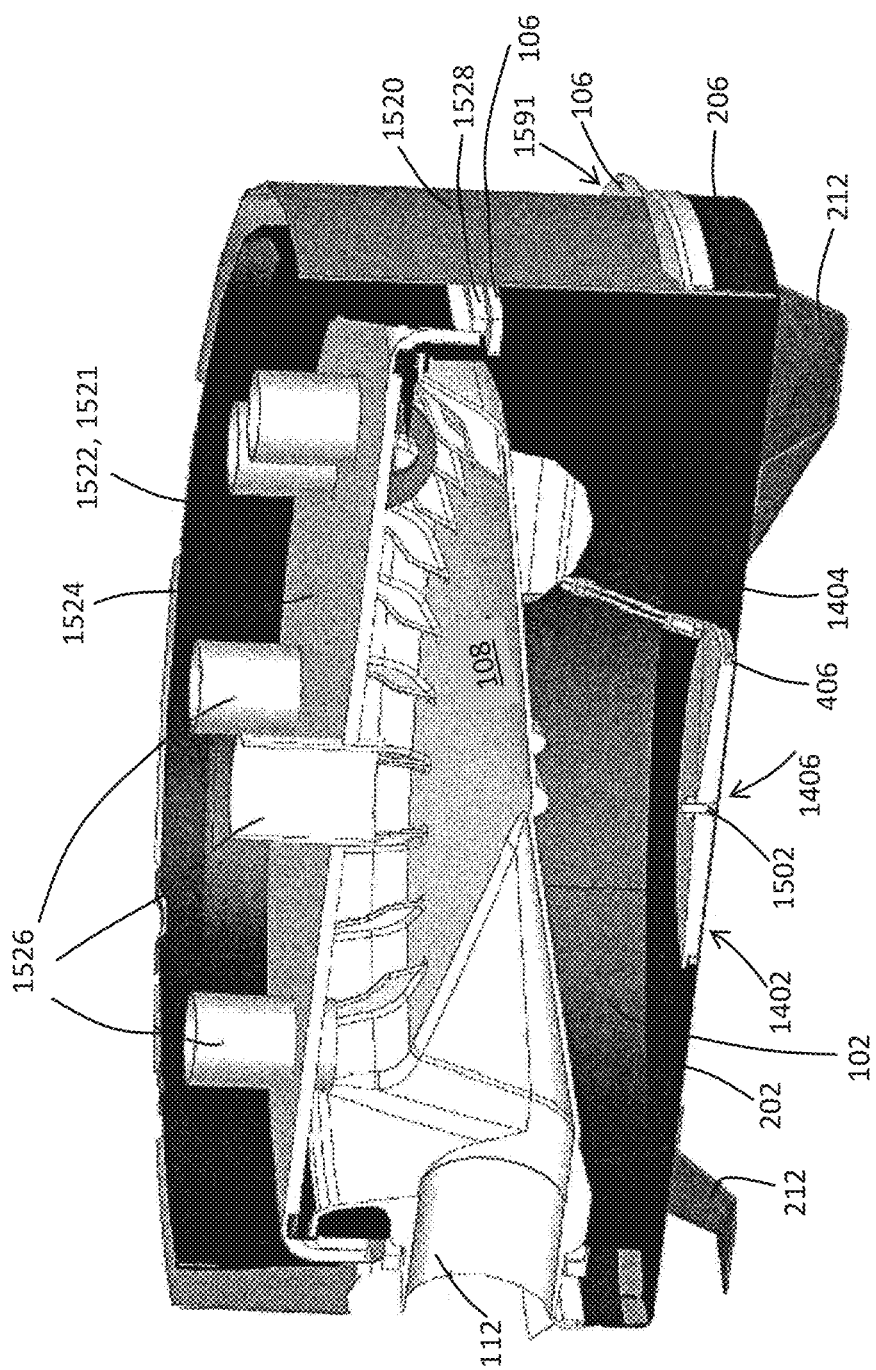
FIG. 15 illustrates a cross-section view of the support assembly of the water heater with the third example leak sensor assembly, the flue gas collector and exhaust pan, a bottom portion of a storage tank of the water heater, and an outer jacket of the water heater, in accordance with example embodiments of the present disclosure.

As illustrated in FIG. 15, the storage tank 1522 includes an annular tank wall 1521 that is attached to a bottom wall 1524 of the storage tank 1522 which has an inverted U-shape. Further, the storage tank 1522 has heat exchanger tubes 1526 that extend through the storage tank 1522 and the bottom wall 1524. As illustrated in FIG. 15, the bottom wall 1524 of the storage tank 1522 may be disposed on a flue gas collector and exhaust pan 108 such that the flue gases pass through the heat exchanger tubes 1526 and enter the flue gas collector and exhaust pan 108. The flue gases exit the water heater through an exhaust pipe 112 of the flue gas collector and exhaust pan 108 that extends through an exhaust opening 110 of the skirt wall 102. In particular, as illustrated in FIGS. 1 and 15, the flue gas collector and exhaust pan 108 is disposed on the top edge 103 of the skirt wall 102 such that is rests above the skirt wall 102 and is sandwiched between the skirt wall 102 and the storage tank 1522.

Additionally, as illustrated in FIG. 15, a bottom portion of the outer jacket 1520 may be disposed in the base 202 of the bottom pan 200 and concentrically around the storage tank 1522 and the skirt-ring assembly 301. The outer jacket 1520 may include one or more exhaust apertures 1902 (shown in FIG. 19) that are formed adjacent a bottom edge of the outer jacket 1520 through which the exhaust pipe 112 of the flue gas collector and exhaust pan 108 extends out of the water heater. Accordingly, the outer jacket 1520 may be disposed concentrically around the skirt-ring assembly 301 such that the exhaust openings (110 or 1408) in the skirt wall 102 and the exhaust apertures 1902 of the outer jacket 1520 may be axially aligned with each other. In addition to providing an exit for the flue gas exhaust pipe 112 of the water heater, the axially aligned exhaust openings (110 or 1408) in the skirt wall 102 and the exhaust apertures 1902 of the outer jacket 1520 may provide a path to access the leak sensor assembly (408, 908, 1402, 2002, and/or 2302) (shown in FIGS. 4, 9, 14, 20, and 23) disposed in the bottom pan 200. For example, the aligned exhaust openings and apertures can be used for inserting the leak sensor assembly into the bottom pan, taking out and drying the leak sensor 1200 (shown in FIG. 12) of the leak sensor assembly, replacing the leak sensor 1200, etc. Furthermore, the axially aligned exhaust openings (110 or 1408) in the skirt wall 102 and the exhaust apertures 1902 of the outer jacket 1520 may provide an exit path for the leak sensor 1200 of the leak sensor assembly from the bottom pan towards a controller 2705 (shown in FIG. 27) of the water heater via one or more extension cables and connectors 1404 (shown in FIGS. 14 and 20).

It is noted that even though the present disclosure describes the storage tank, the skirt-ring assembly, and the outer jacket as having specific shapes and features, such as openings formed therein, one of ordinary skill in the art can understand and appreciate that in other example embodiments, the storage tank, the skirt-ring assembly, and the outer jacket may have any other appropriate shapes along with more or fewer features formed therein without departing from a broader scope of the present disclosure. Further, it is noted that in the present disclosure, the bottom pan and the skirt-ring assembly, in combination, may be referred to as a support assembly without departing from a broader scope of the present disclosure.

One of ordinary skill in the art can understand and appreciate that in addition to the components described above, the water heater may include many other additional components such as, thermostats, heating elements, dip tubes, plumbing, drain pipes, etc. However, said additional components are not described herein to avoid obscuring the features of the leak detection system of the water heater.

Furthermore, in addition to the support assembly, the flue gas collector and exhaust pan, the storage tank, and the outer jacket; the water heater of the present disclosure may include a leak sensor assembly that is disposed in the base 202 of the bottom pan 200 and configured to detect water that leaks from the water heater. The leak sensor assembly includes a sensor housing and a leak sensor disposed in a sensor channel formed in the sensor housing. In particular, the sensor channel defined by the sensor housing is elevated from a base of the bottom pan and is shielded from above to minimize false leak detections. The different example leak sensor assemblies (408, 908, 1402, 2002, and/or 2302) will be described in greater detail below in association with FIGS. 4-24.

First Example Leak Sensor Assembly

Turning to FIGS. 4-8, these figures illustrate the first example leak sensor assembly 408 (herein 'first leak sensor assembly'). As illustrated in FIGS. 4-8, the first leak sensor assembly 408 may include a sensor housing 500 and a leak sensor 1200 (shown in FIG. 12) that is disposed in a sensor channel 602 defined by the sensor housing 500. The sensor housing 500 may include a housing body 502 that has an elongate member 504 and a head 510 that is disposed at a front end 691 of the elongate member 504. The head 510 may be integrally formed with the elongate member 504 or may be attached to the elongate member 504.

The elongate member 504 may have a curved outer profile and may extend from a rear end 690 to a front end 691. Further, the elongate member 504 may define a sensor channel 602 that has a substantially C-shaped cross-sectional profile such that the channel 602 is open at the bottom 706 of the elongate member 504. The channel 602 may extend from the rear end 690 to the front end 691. Further, the channel 602 may extend from the front end 691 of the elongate member 504 to an opening 704 in a vertical member 512 of the head 510 through a cavity 604 in the vertical member 512 of the head 510.

The head 510 of the sensor housing 500 may include the vertical member 512 that extends substantially perpendicular to the elongate member 504 in opposite directions from a front end of the elongate member 504. Further, the head 510 may include an angled member 514 that extends upwards and at an obtuse angle 571 to the vertical member 512 from an end of the vertical member 512; and a horizontal member 516 that extends substantially horizontally from an end of the angled member 514 and substantially parallel to the elongate member 504. The vertical member 512, the angled member 514, and the horizontal member 516 may define an extension 609 of the channel 602 that has a substantially U-shaped cross-sectional profile. Further, the horizontal member 516 may include one or more pairs of snap tabs 520 that extend substantially perpendicular to the horizontal member 506 from a bottom of the horizontal member 506. The snap tabs 520 are configured such that they define substantially C-shaped openings 708.

Figure 12:
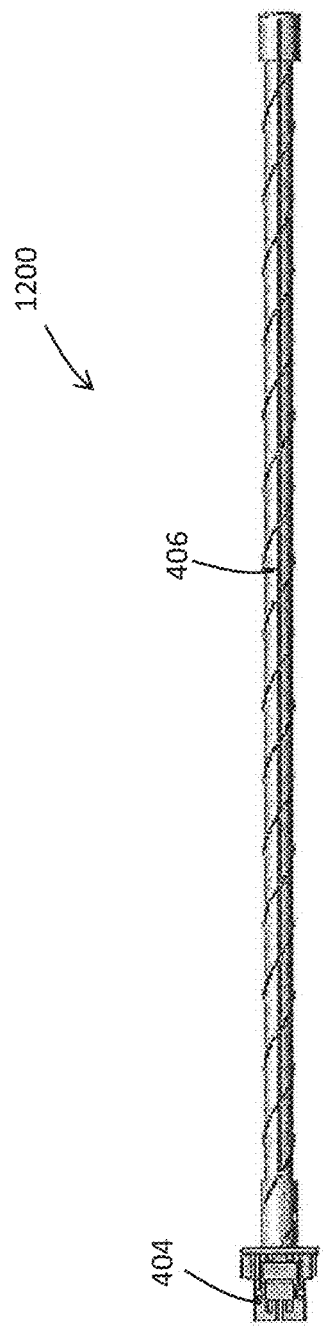
FIG. 12 illustrates a side view of an example leak sensor, in accordance with example embodiments of the present disclosure.

In one example embodiment, as illustrated in FIG. 12, the leak sensor 1200 may be a rope sensor that includes: (a) flexible sensing segment 406 comprising metal sensing wires protected by a fiber material disposed around the sensing wires, and (b) a connector 404 (e.g., male or female connector) that is coupled to the sensing wires of the sensing segment 406 and is disposed at one end of the sensing segment 406. In other example embodiments, the leak detection system may include other appropriate sensors that are configured to detect any appropriate fluids that leak from the water heater 100.

Figure 4:
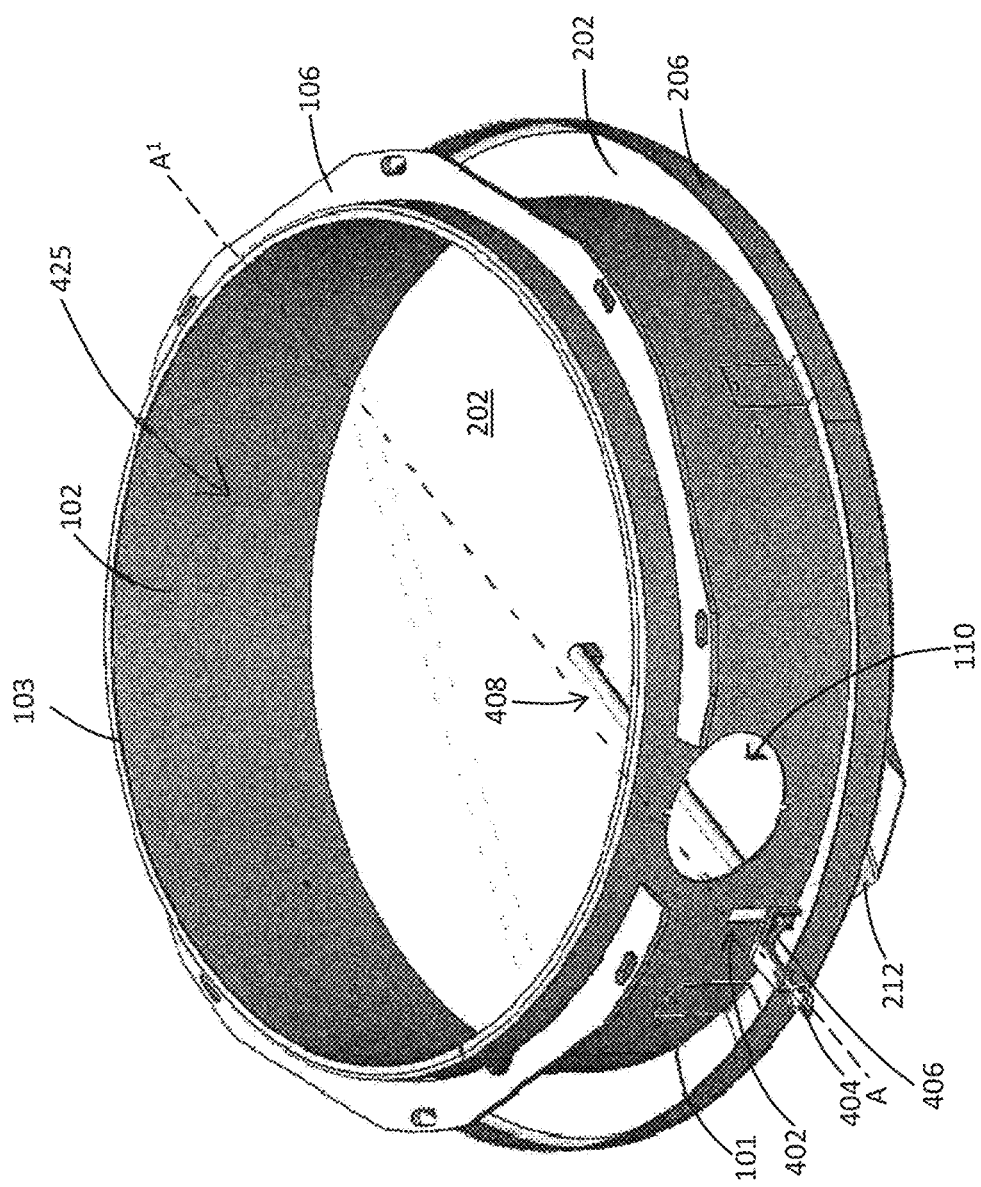
FIG. 4 illustrates a top isometric view of the support assembly of the water heater with a first example leak sensor assembly disposed in the bottom pan of the support assembly, in accordance with example embodiments of the present disclosure.
Figure 5:
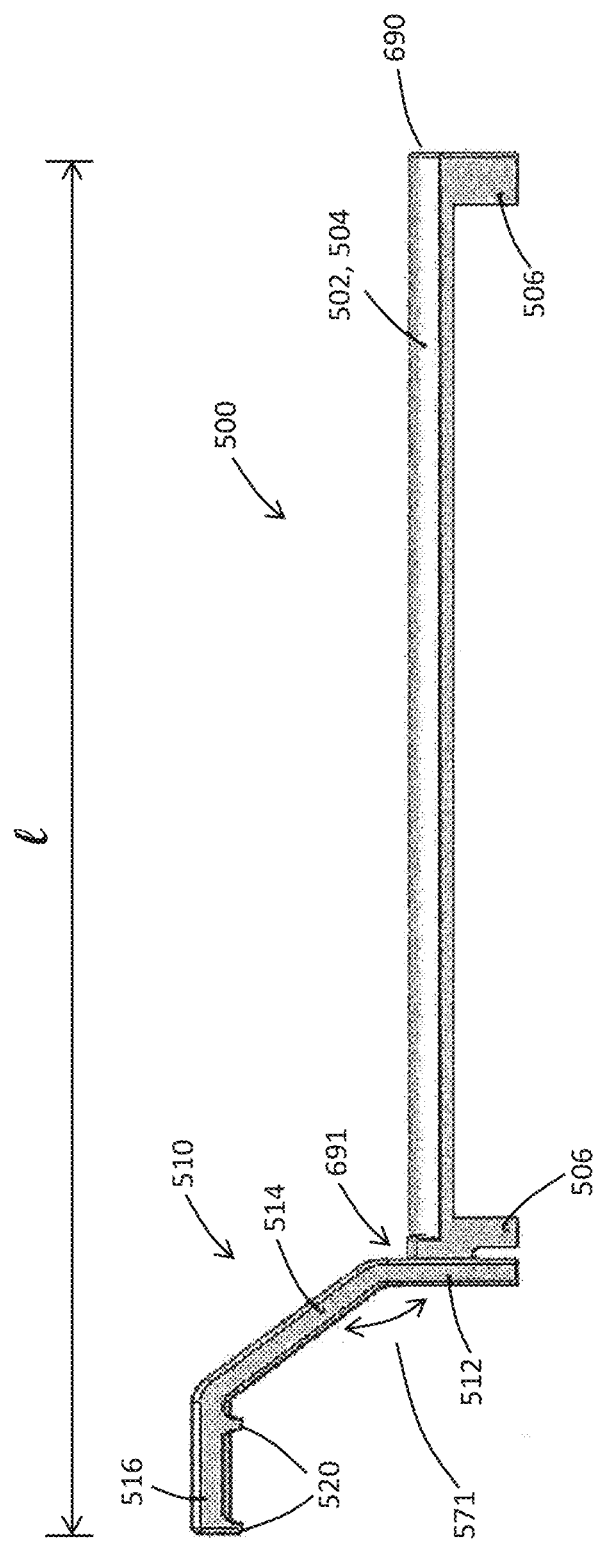
FIG. 5 illustrates a side view of a sensor housing of the first example leak sensor assembly, in accordance with example embodiments of the present disclosure.
Figure 6A:
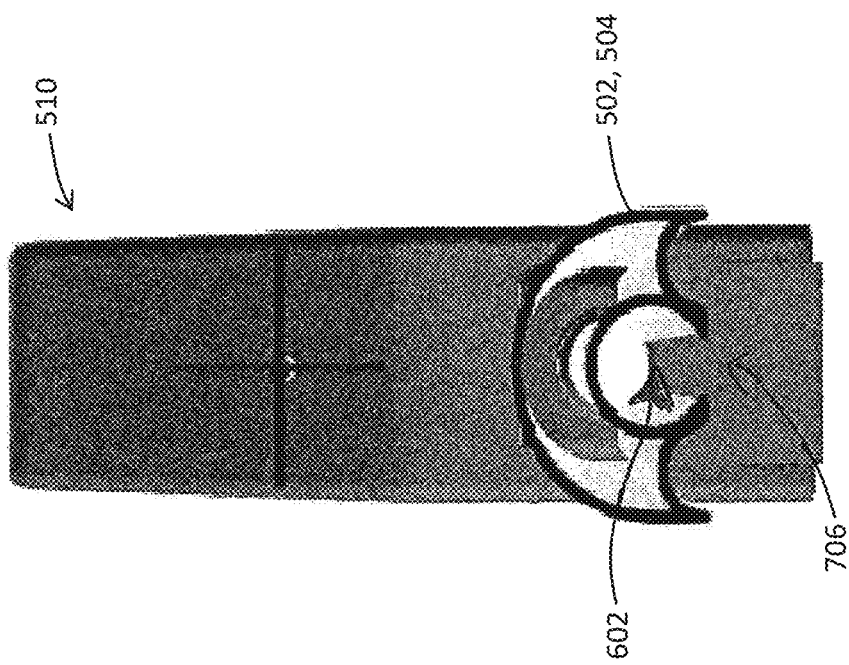
FIGS. 6A and 6B (collectively 'FIG. 6') illustrate different cross-section views of the sensor housing of the first example leak sensor assembly, in accordance with example embodiments of the present disclosure.
Figure 6B:
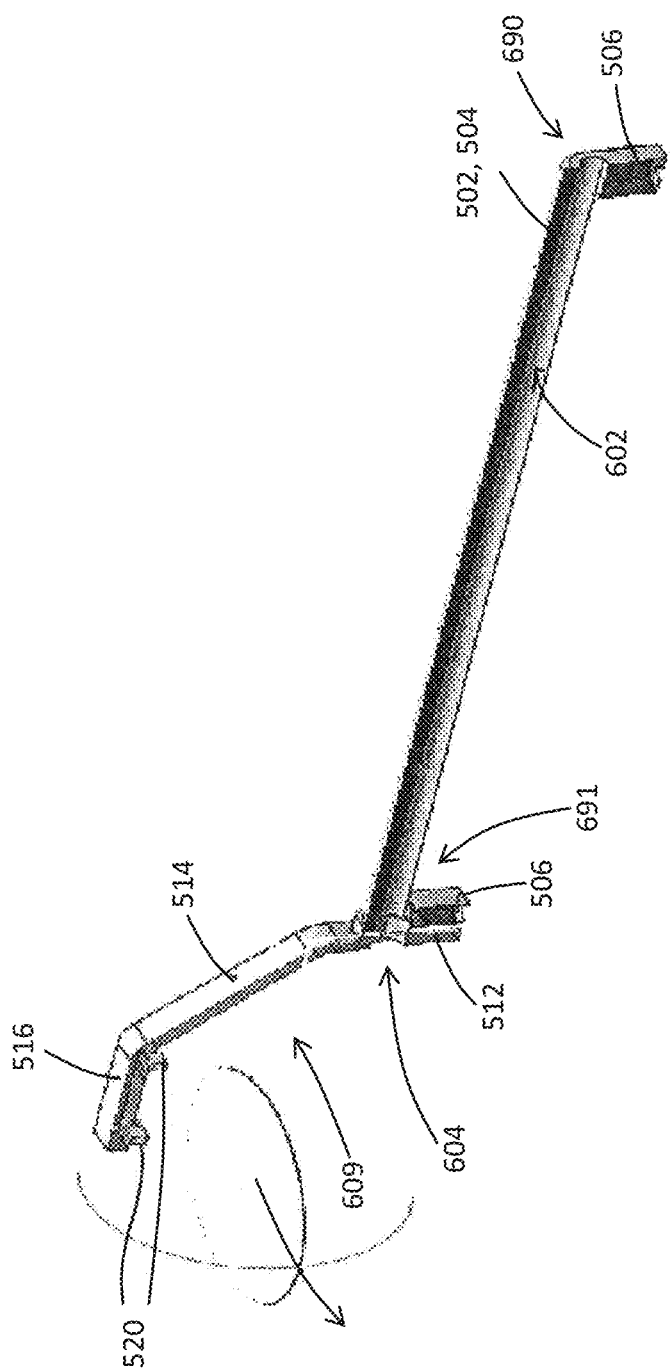
Figure 8:
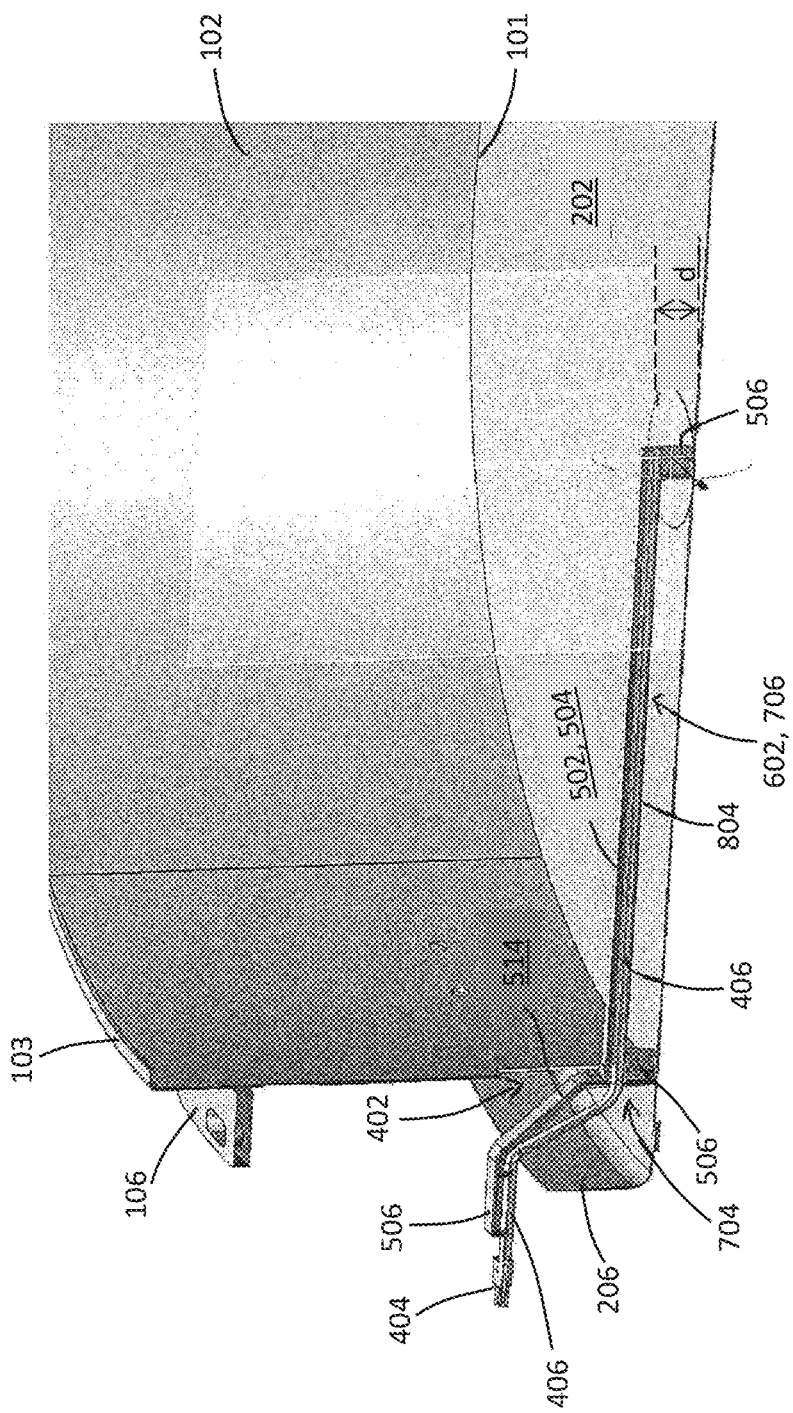
FIG. 8 illustrates an enlarged view of a portion of a cross-section of the support assembly of the water heater with the first example leak sensor assembly along axis A-A' shown in FIG. 4, in accordance with example embodiments of the present disclosure.

As illustrated in FIGS. 4 and 8, the sensing segment 406 of the leak sensor 1200 may be disposed in sensor channel 602 defined by the elongate member 504 of the sensor housing 500. Further, the sensing segment 406 extends through the cavity 604 in the vertical member 512 of the head 510 and exits the cavity 604 through the opening 704 in the vertical member 512 of the head 510. The portion of the sensing segment 406 that exits the vertical member 512 of the head 510 enters into the extension 609 of the channel 602. Furthermore, the sensing segment 406 follows (loosely or tightly) the angled member 514 towards the horizontal member 516 of the head 510. The portion of the sensing segment 406 that extends out from the head 510 into the extension 609 of the channel 602 may be securely retained or held in place by the snap tabs 520. For example, the portion of the sensing segment 406 of the leak sensor 1200 that extends out from the head 510 into the extension 609 of the channel 602 may be securely retained or held in place by snapping the sensing segment 406 into the C-shaped openings 708 defined by the snap tabs 520. The connector 404 of the leak sensor 1200 extends out from the horizontal member 516 of the head 510 of the sensor housing 500.

In some example embodiments, the length 'l' of the sensor housing 500 (shown in 'FIG. 5') may be larger than a radius of the skirt wall 102. Accordingly, a notch 402 (shown in FIG. 4) may be formed in the skirt wall 102 to provide clearance for the head 510 of the sensor housing 500 to pass through the skirt wall 102. As illustrated in FIGS. 4 and 8, the head 510 of the sensor housing 500 extends out from the skirt wall 102 through the notch 402. Further, the angled member 514 of the sensor housing 500 may be configured such that the head 510 of the sensor housing 500 that extends out from the skirt wall 102 through the notch 402 can clear the sidewall 206 and/or the channeling member 204 of the bottom pan 200 by passing over the sidewall 206 and/or the channeling member 204 of the bottom pan 200. In other words, the magnitude of the obtuse angle 571 between the angled member 514 and the vertical member 512 of the head 510 or the slope of the angled member 514 may be defined such that the leak sensor assembly 408 (the head 510) clears the sidewall 206 and/or the channeling member 204 of the bottom pan 200 by passing over the sidewall 206 and/or the channeling member 204 of the bottom pan 200.

In addition to the elongate member 504 and the head 510, the sensor housing 500 may include feet 506 that extend substantially perpendicular to the elongate member 504 from the bottom 706 of the elongate member 504. The feet 506 may be disposed adjacent the front end 691 and the rear end 690 of the elongate member 504. In other example embodiments, the sensor housing 500 may include more or fewer feet 506 disposed at any appropriate portion of the sensor housing without departing from a broader scope of the present disclosure. In particular, the feet 506 may be configured to elevate the sensor channel 602 defined by the elongate member 504 from the base 202 of the bottom pan 200 when the sensor housing 500 is disposed on the base 202 of the bottom pan 200. For example, as illustrated in FIGS. 4 and 8, the sensor housing 500 may be mounted to the base 202 of the bottom pan 200 such that the feet 506 of the sensor housing 500 engage the base 202 of the bottom pan 200 and the sensor channel 602 defined by the elongate member 504 may be elevated from the base 202 of the bottom pan 200 by a distance 'd'. The elevation of the sensor channel 602 from the base 202 of the bottom pan 200 is provided to avoid triggering the leak sensor 1200 disposed in the sensor channel 602 when only a little water drips into the pan, thereby avoiding false positive detections. Furthermore, to avoid false positive detections, the curved body of the elongate member 504 is configured such that it shields the sensor channel 602 and the leak sensor 1200 disposed therein from above from water that may drip onto the leak sensor assembly 408 from above the leak sensor assembly 408, such as water from condensation in the flue gas collector and exhaust pan 108 which is not based on a leak condition. Any water that drips on top of the leak sensor assembly 408 may be directed down towards the base 202 of the bottom pan 200 by the head 510 or the curved body of the elongate member 504. Further, water (either from a leak condition or a non-leak condition (condensation)) may accumulate in the bottom pan 200 and trigger the leak sensor 1200 when the water level in the bottom pan 200 rises approximately by the distance 'd' (e.g., the elevation of the sensor channel 602) from the base 202 of the bottom pan 200. In particular, water that accumulates and rises in the bottom pan 200 may contact a portion of the leak sensor 1200 that is exposed through the opening in the channel 602 at the bottom 706 of the elongate member 504. The height of the feet 506 may determine the distance 'd' by which the leak sensor 506 is elevated above the base 202 of the bottom pan 200, which in turn determines the amount of water that needs to accumulate in the bottom pan 200 before the leak sensor is triggered to notify a leak condition.

Figure 7:
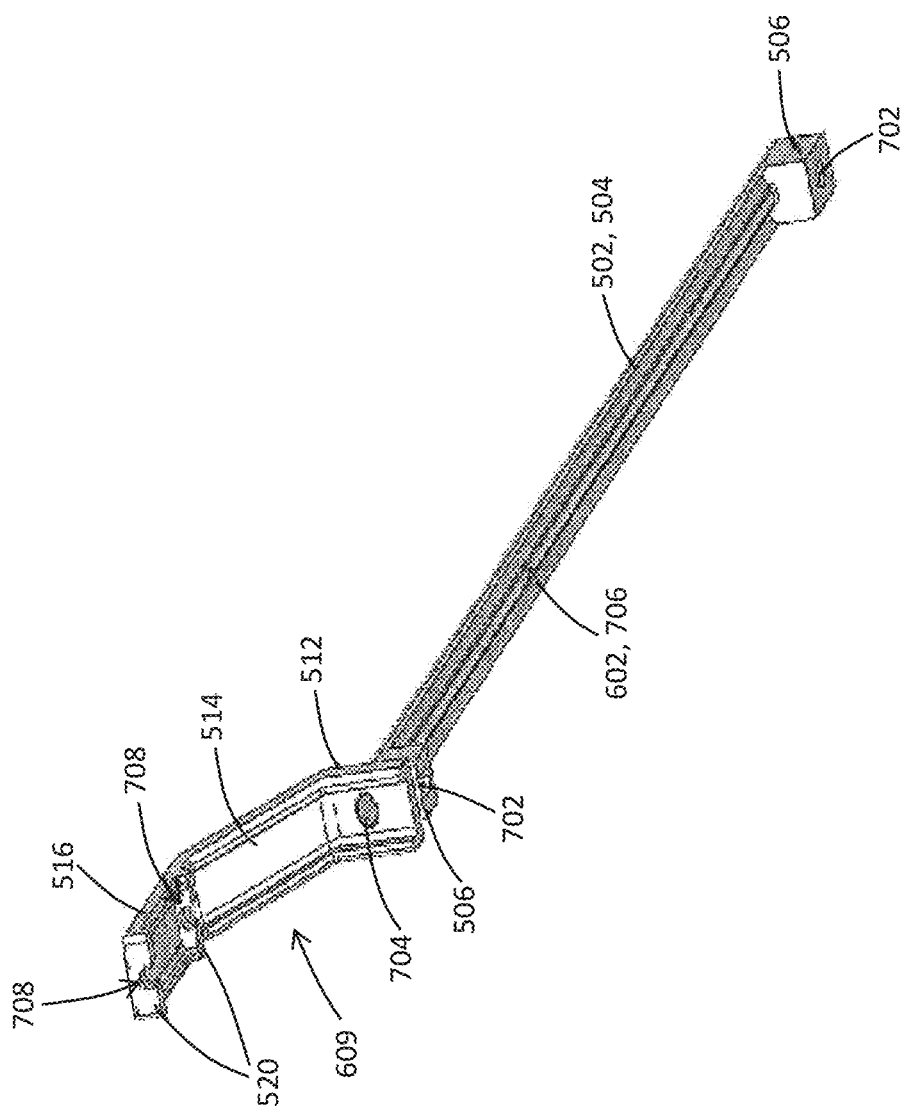
FIG. 7 illustrates a bottom isometric view of the sensor housing of the first example leak sensor assembly, in accordance with example embodiments of the present disclosure.

As illustrated in FIG. 7, the feet 506 of the sensor housing 500 may include blind cavities 702 formed in the bottom portion of the feet 506. The blind cavities 702 may be configured to receive fasteners therethrough to couple and securely retain the sensor housing 500 to the bottom pan 200. Alternatively, in other example embodiments, the sensor housing 500 may be coupled to the bottom pan 200 using other coupling mechanisms, such as adhesives, press-down features, snap features, etc., without departing from a broader scope of the present disclosure.

As described above in association with FIGS. 1-3 and 25, water that leaks from the outer jacket 1520 or fittings of the water heater may be received by the channeling member 204 and directed towards the bottom pan 200 via a gap 1591 in between the outer jacket 1520 and the sidewall 206 of the bottom pan 200 or exhaust openings 1902 (shown in FIG. 19) of the outer jacket 1520. Further, water that enters the bottom pan may pass through a gap between the bottom edge 101 of the skirt wall 102 and the base 202 of the bottom pan 200 towards the leak sensor assembly 408. Alternatively, openings may be provided in the skirt wall 102 to pass water from outside the skirt wall 102 to an interior cavity 425 defined by the skirt wall 102. Similarly, water that leaks from the storage tank 1522 into a cavity between the storage tank and the outer jacket 1520 may pass through a gap between the outer jacket 1520 and the storage tank 1522 towards the base 202 of the bottom pan 200.

In either case, when the water accumulates in the bottom pan 200 and rises to the elevation of the sensor channel 602 and the leak sensor 1200 disposed therein, the water triggers the leak sensor 1200. Once a leak is detected by the sensing segment 406 of the leak sensor 1200, the leak sensor 1200 may send a signal to a controller 2705 of the water heater 100. The leak sensor 1200 may be electrically coupled to the controller 2705 of the water heater by plugging the connector 404 of the leak sensor 1200 into a corresponding connector receptacle (not shown) of the water heater 100 that is connected to the controller 2705. Upon receiving the signal from the leak sensor 1200, the controller 2705 may generate and transmit a notification alerting an end user regarding the leak. Responsively, the controller 2705 may wait to receive an input from the end user or automatically control a shut off valve to interrupt water flow into the storage tank of the water heater. An example operation of the controller 2705 will be described below in greater detail in association with FIG. 26.

Figure 26A:
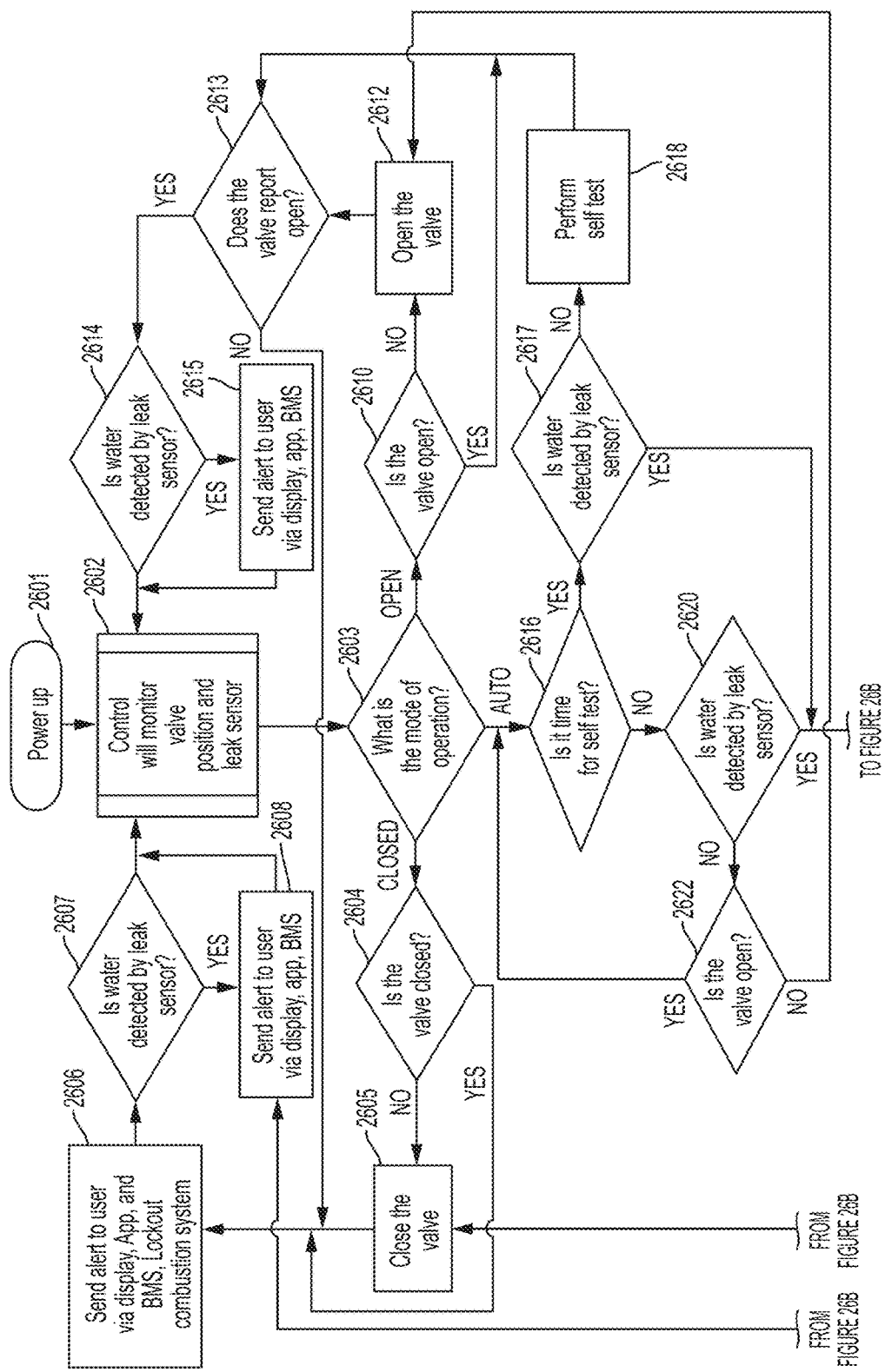

Although specific operations are disclosed in the flowchart illustrated in FIG. 26, such operations are exemplary. That is, embodiments of the present invention are well suited to performing various other operations or variations of the operations recited in the flowchart. It is appreciated that the operations in the flowchart illustrated in FIG. 26 may be performed in an order different than presented, and that not all of the operations in the flowchart may be performed.

All, or a portion of, the embodiments described by the flowchart illustrated in FIG. 26 can be implemented using computer-readable and computer-executable instructions which reside, for example, in a memory associated with the controller 2705 or computer-usable media of a computer system or like device. As described above, certain processes and operations of the present invention are realized, in one embodiment, as a series of instructions (e.g., software programs) that reside within a memory associated with the controller 2705 or a computer readable memory of a computer system and are executed by a circuit of the controller 2705 or the processor of the computer system. When executed, the instructions cause the computer system or the controller 2705 to implement the functionality of the present invention as described below.

Figure 27:
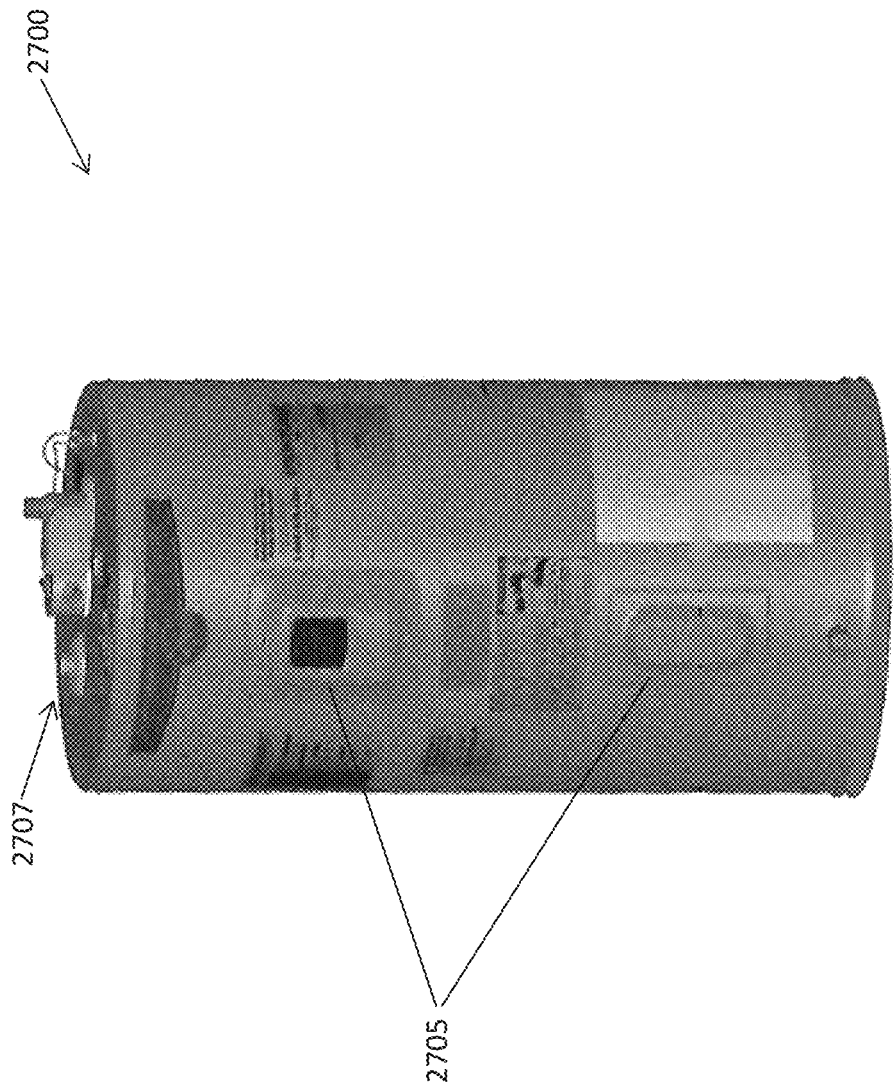
FIG. 27 illustrates an example water heater, in accordance with example embodiments of the present disclosure.

The controller 2705 may be disposed within the water heater as illustrated in FIG. 27 and may comprise input/output ports, one or more processors, a memory, and/or a communication interface for wireless and wired communication. Further, the shut-off valve 2707 may be disposed at the inlet, e.g., cold water inlet, of the water heater as illustrated in FIG. 27.

Turning to FIG. 26, in operations 2601-2603, the controller 2705 will monitor a leak sensor 1200 and a valve position of a shut-off valve 2707 of the water heater that is configured to control water flow (water that is to be heated, e.g., cold water) into a storage tank of the water heater. Further, the controller 2705 determines a mode of operation of the shut-off valve 2707 which can include a closed mode, an open mode, and an automatic mode. The automatic mode refers to a mode where the operation of the shut-off valve 2707 is tied to the leak sensor 1200 such that if a leak is detected, the shut-off valve 2707 is closed, otherwise the shut-off valve 2707 is open. In the open mode, the shut-off valve 2707 is always open, while in the closed mode, the shut-off valve 2707 is always closed. In some embodiments, the shut-off valve 2707 may have an automatic when unoccupied mode of operation where the shut-off valve 2707 is closed only if the leak is detected outside of a predetermined time period, e.g., business hours.

If the controller 2705 determines that the shut-off valve 2707 is operating in a closed mode, then the controller 2705 proceeds to execute operations 2604-2608, where the shut-off valve 2707 is closed and an alert indicating that the shut-off valve 2707 has been closed is sent to a user if the controller 2705 determines that the shut-off valve 2707 is open when operating in the closed mode. Alternatively, if the controller 2705 determines that the shut-off valve 2707 is closed, then an alert is sent to the user indicating the state of the shut-off valve 2707 as being closed. Further, the controller 2705 determines whether water is detected by the leak sensor 1200. If water is detected by the leak sensor 1200 (leak condition), the controller 2705 sends an alert to a user indicating that a water leak has been detected. The alert may also prompt the user to provide response indicating whether the controller 2705 is to close the shut-off valve 2707. Accordingly, the controller 2705 may wait to receive an input from the user (either directly or via a computing device of the user) and controls the shut-off valve 2707 based on the input received from the user.

If the controller 2705 determines that the shut-off valve 2707 is operating in the open mode, then the controller 2705 proceeds to execute operations 2610-2615, where the shut-off valve 2707 is opened if the controller 2705 determines that the shut-off valve 2707 is closed when operating in the open mode. Alternatively, if the controller 2705 determines that the shut-off valve 2707 is open, then an alert is sent to the user if the valve is not reporting that it is open despite of being open. Further, the controller 2705 determines whether water is detected by the leak sensor 1200. If water is detected by the leak sensor 1200 (leak condition), as in the case of the closed mode discussed above, the controller 2705 sends an alert to a user indicating that a water leak has been detected. As discussed above, the alert prompts the user to provide a response indicating whether the controller 2705 is to close the shut-off valve 2707. Accordingly, the controller 2705 waits to receive an input from the user and controls the shut-off valve 2707 based on the input received from the user.

If the controller 2705 determines that the shut-off valve 2707 is operating in the automatic mode, then the controller 2705 proceeds to execute operations 2616-2628, where the controller 2705 performs a self-test when the controller 2705 determines that it is time for a self-test of the shut-off valve 2707 and that water is not detected by the leak sensor. Self-test refers to a process where periodically (every day, week, month, etc.) the controller 2705 closes the shut-off valve 2707 and waits for a verification signal to make sure the controller 2705 can close the shut-off valve 2707. If the controller 2705 doesn't receive the verification signal, the controller 2705 sends an alarm. Further, once the shut-off valve 2707 is closed, the controller 2705 opens it again and waits for the verification signal to make sure the shut-off valve 2707 is fully open. If the controller 2705 cannot verify that the shut-off valve 2707 is fully open, the controller 2705 sends an alarm.

If the leak sensor detects water, then, the controller 2705 determines whether the shut-off valve 2707 is to be controlled based on a schedule. If not, the controller 2705 closes the shut-off valve 2707 upon determining that the leak sensor has detected water. However, if the shut-off valve 2707 is to be controlled based on a schedule, the controller 2705 determines whether a time at which the leak sensor detected the water and reported to the controller 2705 (via a signal) is within a scheduled timeframe. The timeframe may be scheduled based on business hours or may be selected by the user. If the time at which the leak sensor detected the water and reported to the controller 2705 (via a signal) is outside of a scheduled timeframe (first mode of operation), then, the controller 2705 automatically closes the shut-off valve 2707. However, if the time at which the leak sensor detected the water and reported to the controller 2705 (via a signal) is within a scheduled timeframe (second mode of operation), then, the controller 2705 sends an alert (notification) to the user and waits for an input from the user to control the shut-off valve 2707 based on the received user input. In some embodiments, if the user input is not received within a predetermined time period, the controller 2705 may automatically close the shut-off valve 2707 (override mode).

In one or more example embodiments, the alert can be transmitted to the user's mobile computing device or a desktop via a wireless or a wired network to which the controller 2705 may be communicatively coupled. That is the controller 2705 may have wireless and/or wired network interfaces. The alert may also be transmitted to a building management system (BMS) to which a user has access. Further, a response from the user, i.e., the user input may be transmitted back to the controller 2705 from a computing device via a wireless or a wired network.

In some embodiments, the shut-off valve 2707 described herein can work as an isolation valve independent of the leak sensor operation. Further, as discussed above, the shut-off valve 2707 can be configured to operate differently within operating hours of a business or within a certain timeframe selected by the user, e.g., (a) within operating hours, the shut off valve may not close in response to leak, and (b) outside operating hours, the shut off valve may close in response to leak. The controller 2705 control the shut-off valve 2707. Furthermore, as discussed above, the controller 2705 can send a message to user's cell phone asking whether the shut off valve needs to be closed and act according to the user's response.

In some example embodiments, one or more extension wiring cables and connectors 1404 (shown in FIG. 14) may be used to extend and indirectly couple the leak sensor 1200 to the connector receptacle of the water heater. Alternatively, longer leak sensors that can directly reach the connector receptacle of the water heater may be used. In either case, the leak sensor 1200 may exit the skirt wall 102 and the outer jacket 1520 through the exhaust openings (110 or 1408, and 1902) in the skirt wall 102 and the outer jacket 1520. Further, after the leak sensor 1200 comes in contact with the water and the notification alerting the end user regarding the leak is transmitted, the end user may access the leak sensor assembly 408 through the axially aligned exhaust aperture 1902 of the outer jacket 1520 and the exhaust openings (110 or 1408) of the skirt wall 102 to: remove the leak sensor 1200, dry the leak sensor 1200, and place the leak sensor 1200 back in the sensor housing 500. Alternatively, the end user may access the leak sensor assembly 408 to replace the leak sensor 1200.

Even though the present disclosure describes that the sensor housing is disposed in the bottom pan, one of ordinary skill in the art can understand and appreciate that the sensor housing may be disposed in any other reservoir that is configured to collect water that leaks from the water heater. In some example embodiments, the reservoir may be the bottom pan, however, in other example embodiments, the reservoir may be a different component that is configured to accumulate water that leaks from the water heater. In the other example embodiments, the reservoir may be disposed at any other portion of the water heater, e.g., between the top end and bottom end of the water heater. In yet another example embodiment, the reservoir may be disposed adjacent to or in proximity to the water heater and the water heater may have mechanisms to direct leaked water towards the reservoir.

Figure 20:
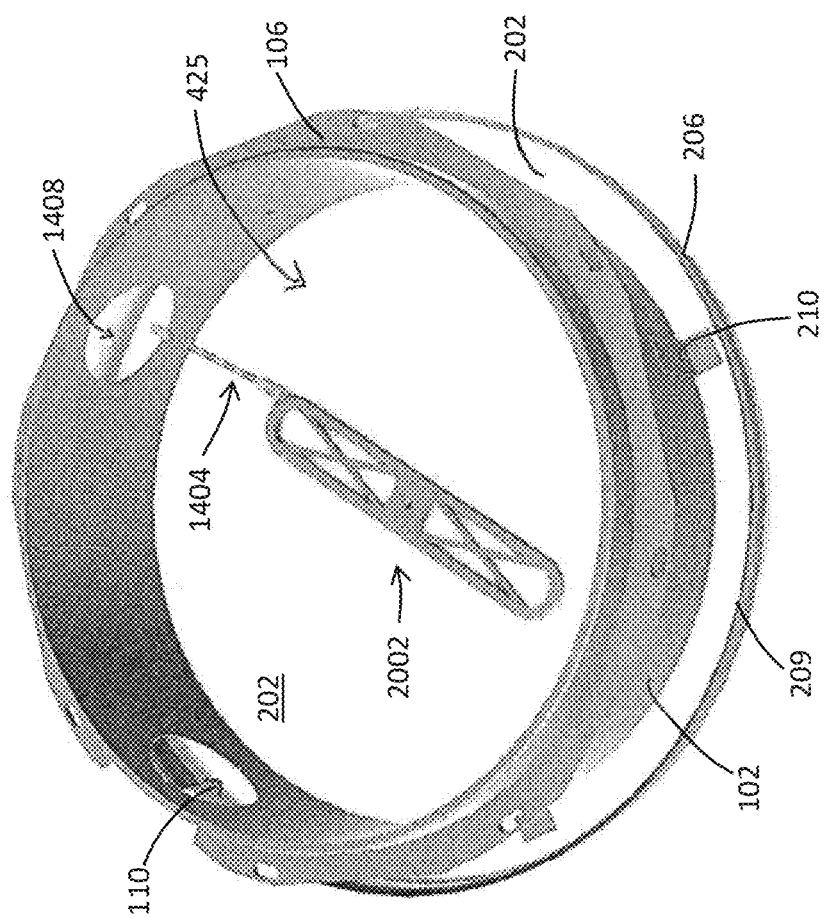
FIG. 20 illustrates a top isometric view of the support assembly of the water heater with a fourth example leak sensor assembly disposed in the bottom pan of the support assembly, in accordance with example embodiments of the present disclosure.
Figure 21:
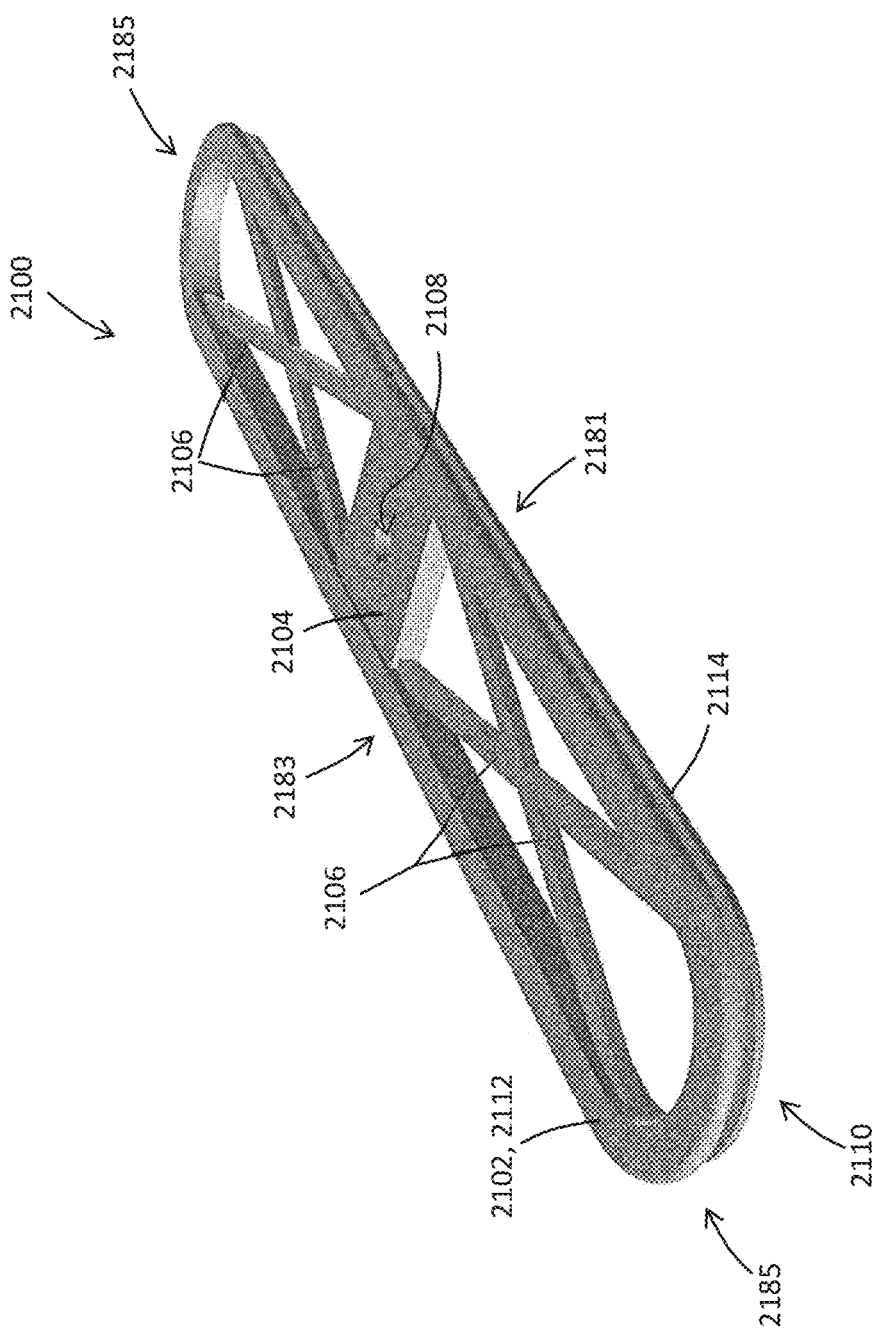
FIG. 21 illustrates a top isometric view of a housing of the fourth example leak sensor assembly, in accordance with example embodiments of the present disclosure.
Figure 22:
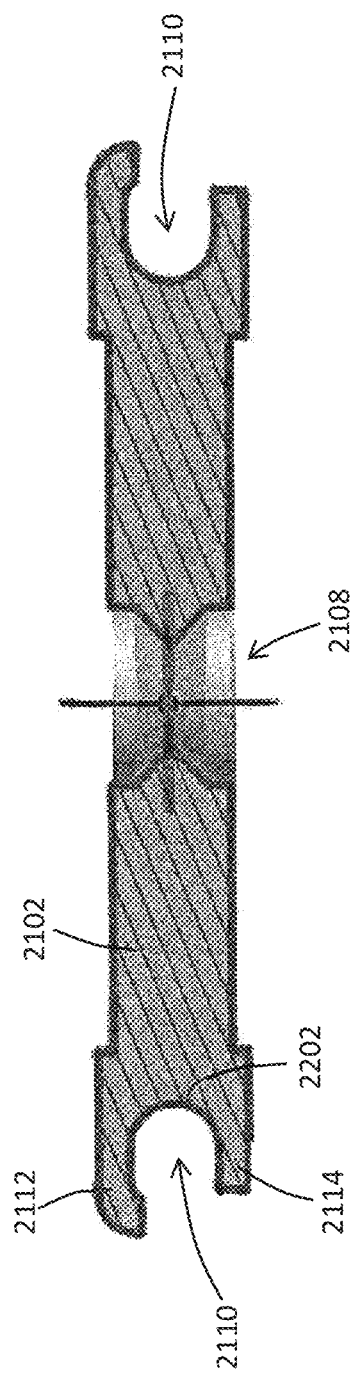
FIG. 22 illustrates a cross-section view of the housing of the fourth example leak sensor assembly, in accordance with example embodiments of the present disclosure.
Figure 23:
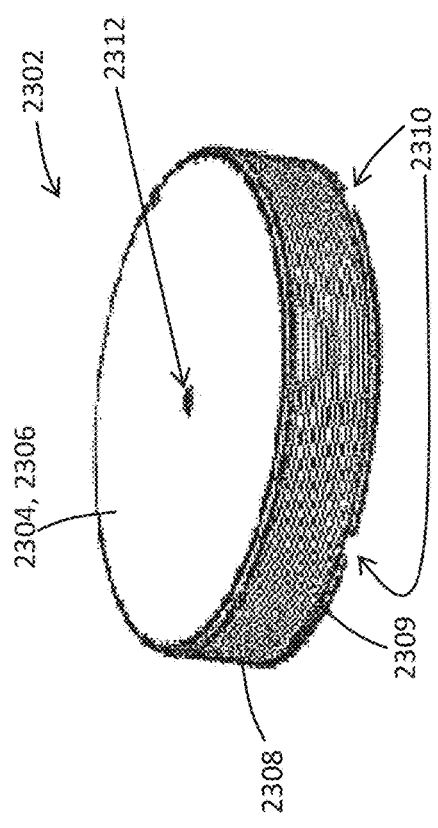
FIG. 23 illustrates a top isometric view of a fifth example leak sensor assembly, in accordance with example embodiments of the present disclosure.
Figure 24:
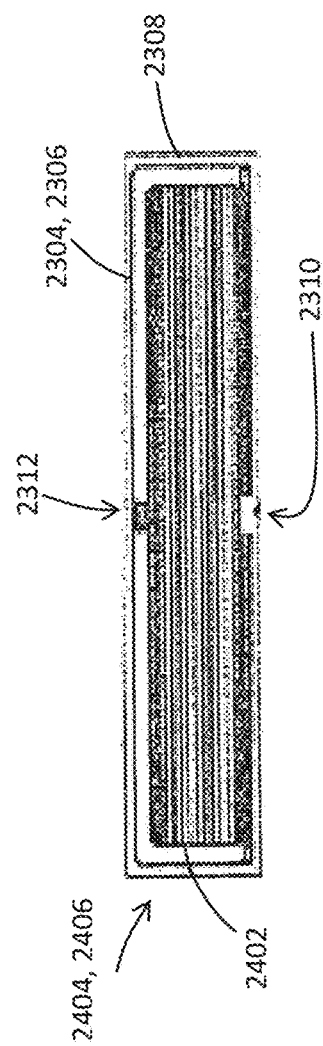
FIG. 24 illustrates a cross-section view of a housing of the fifth example leak sensor assembly, in accordance with example embodiments of the present disclosure.

Even though the present disclosure describes a sensor housing 500 of the first leak sensor assembly 408 having a specific structure, one of ordinary skill in the art can understand and appreciate in other example embodiments, sensor housings and leak sensor assemblies having any other appropriate shape, size, or structure may be used without departing from a broader scope of the present disclosure. For example, the water heater may include a second example leak sensor assembly 908 as illustrated in FIGS. 9-13; a third example sensor assembly as illustrated in FIGS. 14-19; a fourth example leak sensor assembly as illustrated in FIGS. 20-22; or a fifth example leak sensor assembly as illustrated in FIGS. 23-24.

Second Example Leak Sensor Assembly

Turning to FIGS. 9-13, these figures illustrate the second example leak sensor assembly 408 (herein 'second leak sensor assembly'). As illustrated in FIGS. 9-13, the second leak sensor assembly 908 may include a sensor housing 1000 and a leak sensor 1200 that is disposed in a channel 1102 formed in the sensor housing 1000. The sensor housing 1000 may include an elongate body 1002 that extends from a rear end 1099 to a front end 1098, and a head 904 that is disposed at the front end 1098 of the elongate body 1002. In particular, the elongate body 1002 includes a linear portion 1004, and an angled portion 1008 that extends upwards and at an obtuse angle 1087 to the linear portion from an end of the linear portion 1004. Further, the elongate body 1002 may include a top surface 1089 and a sidewalls 1091 that extend substantially perpendicular to the top surface 1089 from opposite edges of the top surface 1089 such that they define a substantially U-shaped or C-shaped cross-sectional profile that is shielded from above and the sides by the elongate body 1002. The sensor channel 1102 extends from the rear end 1099 to the front end 1098 of the elongate body 1002. Further, the sensor channel 1102 extends from the elongate body 1002 to an opening 1104 in the front of the main head member 1010 of the head 904 through a substantially U-shaped cavity in the main head member 1010. That is, the sensor channel 1102 runs through the entire length of the sensor housing 1000 from a rear end 1099 of the sensor housing to the front 1097 of the sensor housing 1000. The sensor channel 1102 may be open at a bottom 1195 of the sensor housing 1000.

In addition to the main head member 1010, the head 904 may include a resilient latching element 1012 that is attached to and disposed above the main head member 1010. The resilient latching element 1012 extends slantingly above a top surface of the main head member 1010 toward the front 1097 of the sensor housing 1000.

Figure 9:
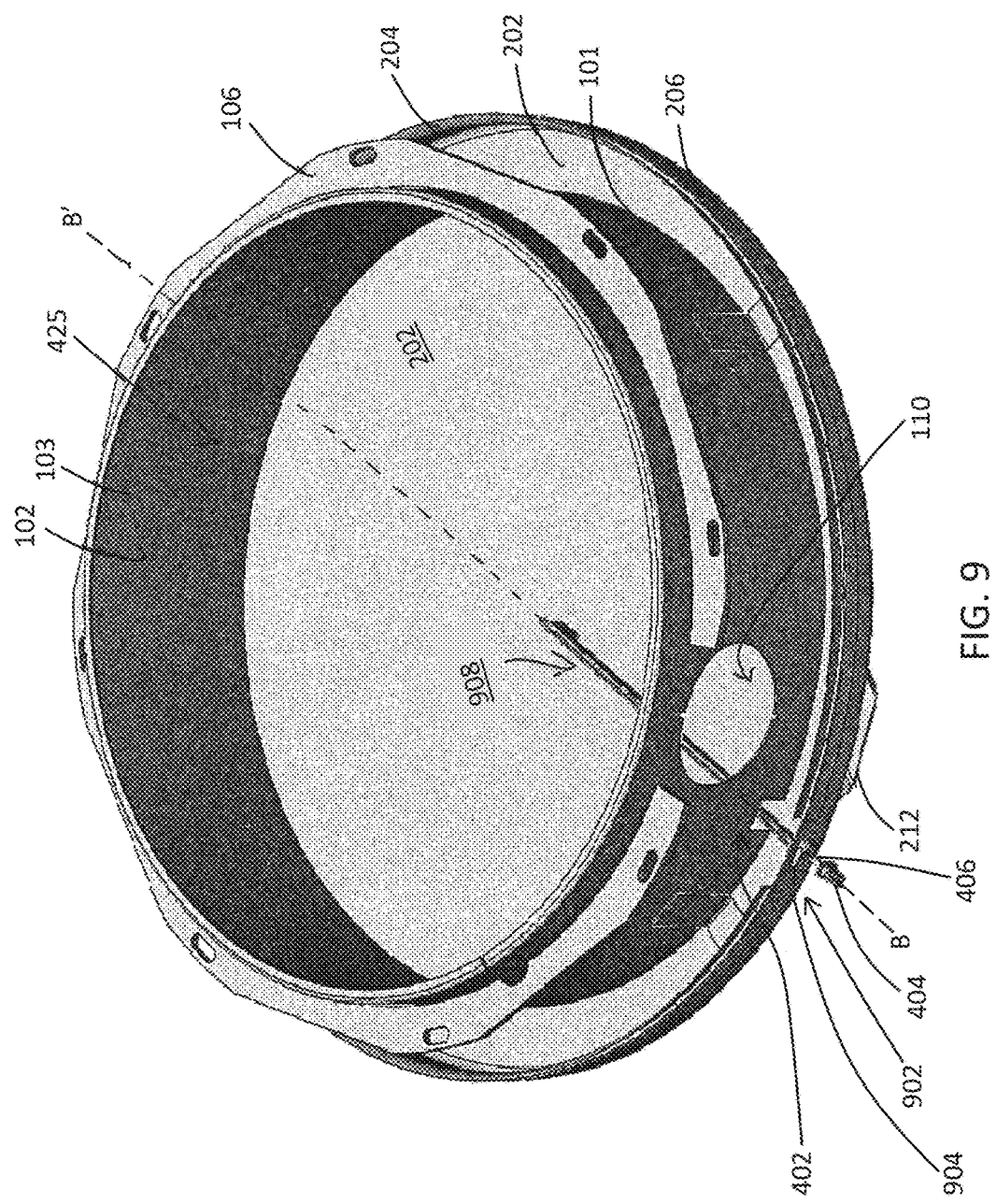
FIG. 9 illustrates a top isometric view of the support assembly of the water heater with a second example leak sensor assembly disposed in the bottom pan of the support assembly, in accordance with example embodiments of the present disclosure.
Figure 10:
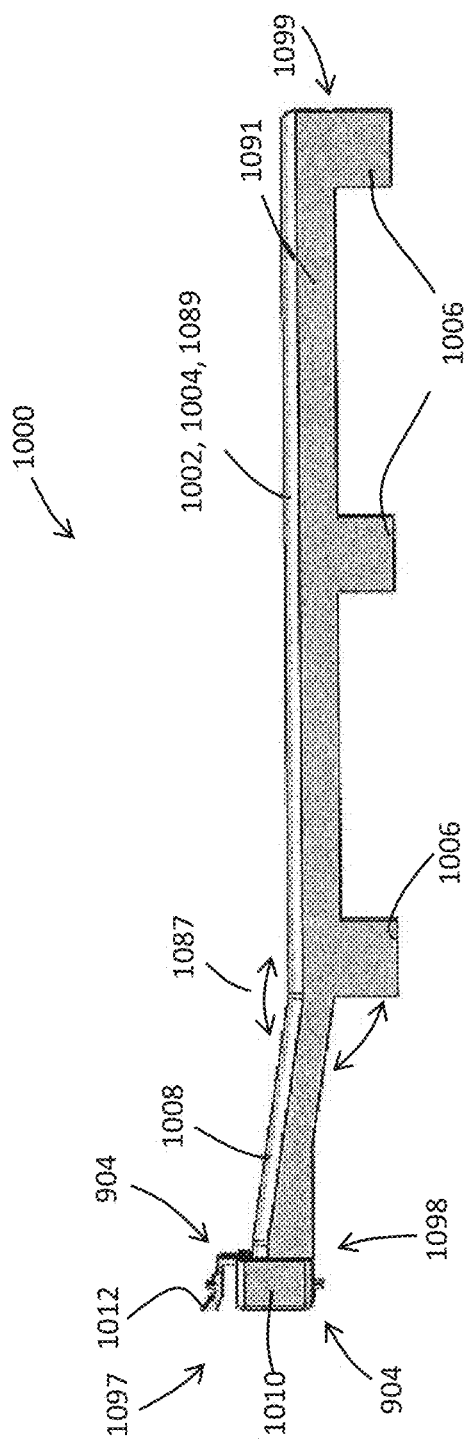
FIG. 10 illustrates a side view of a sensor housing of the second example leak sensor assembly, in accordance with example embodiments of the present disclosure.
Figure 11A:
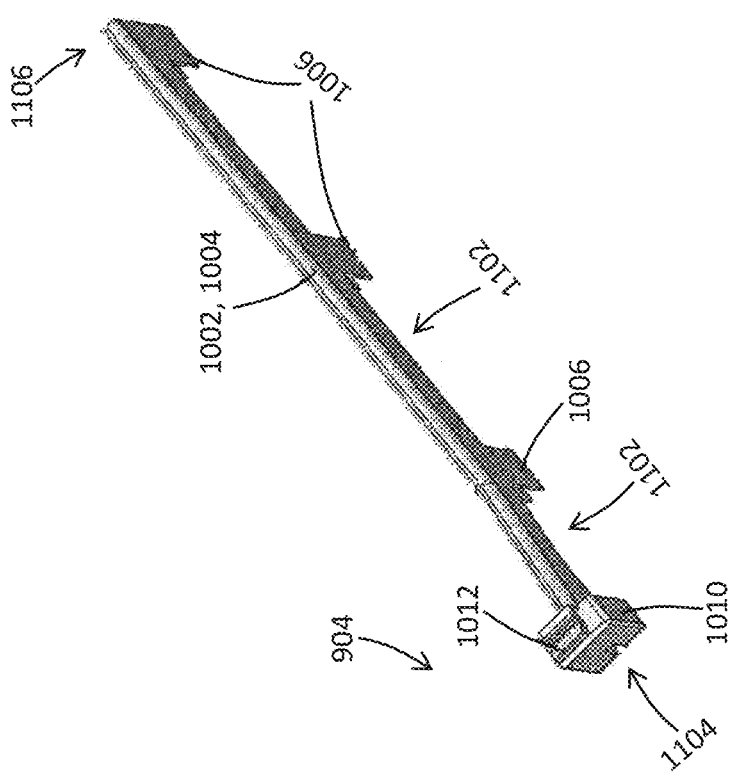
FIGS. 11A and 11B (collectively 'FIG. 11') illustrate top and bottom isometric views of the sensor housing of the second example leak sensor assembly, in accordance with example embodiments of the present disclosure.
Figure 11B:
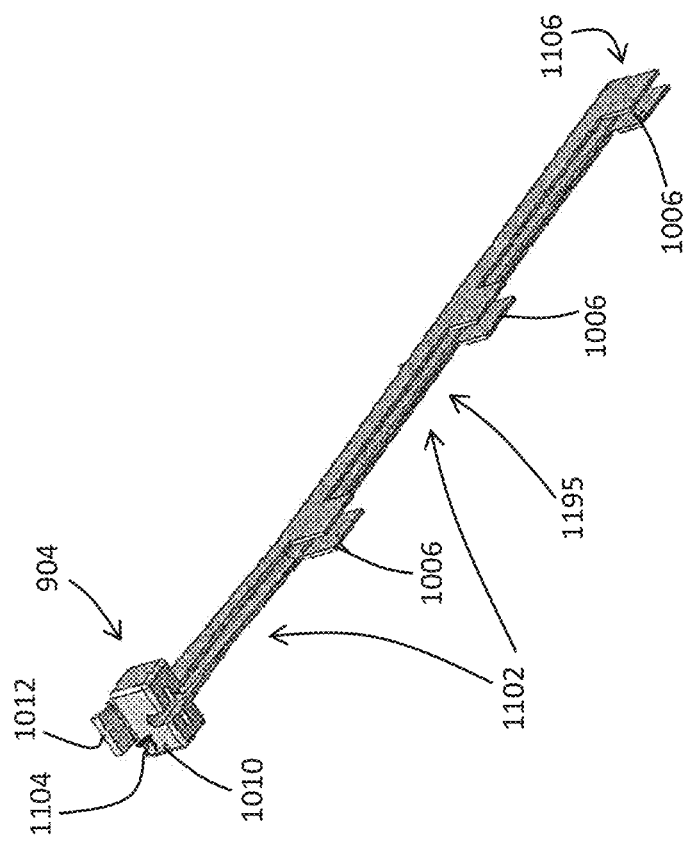
Figure 13:
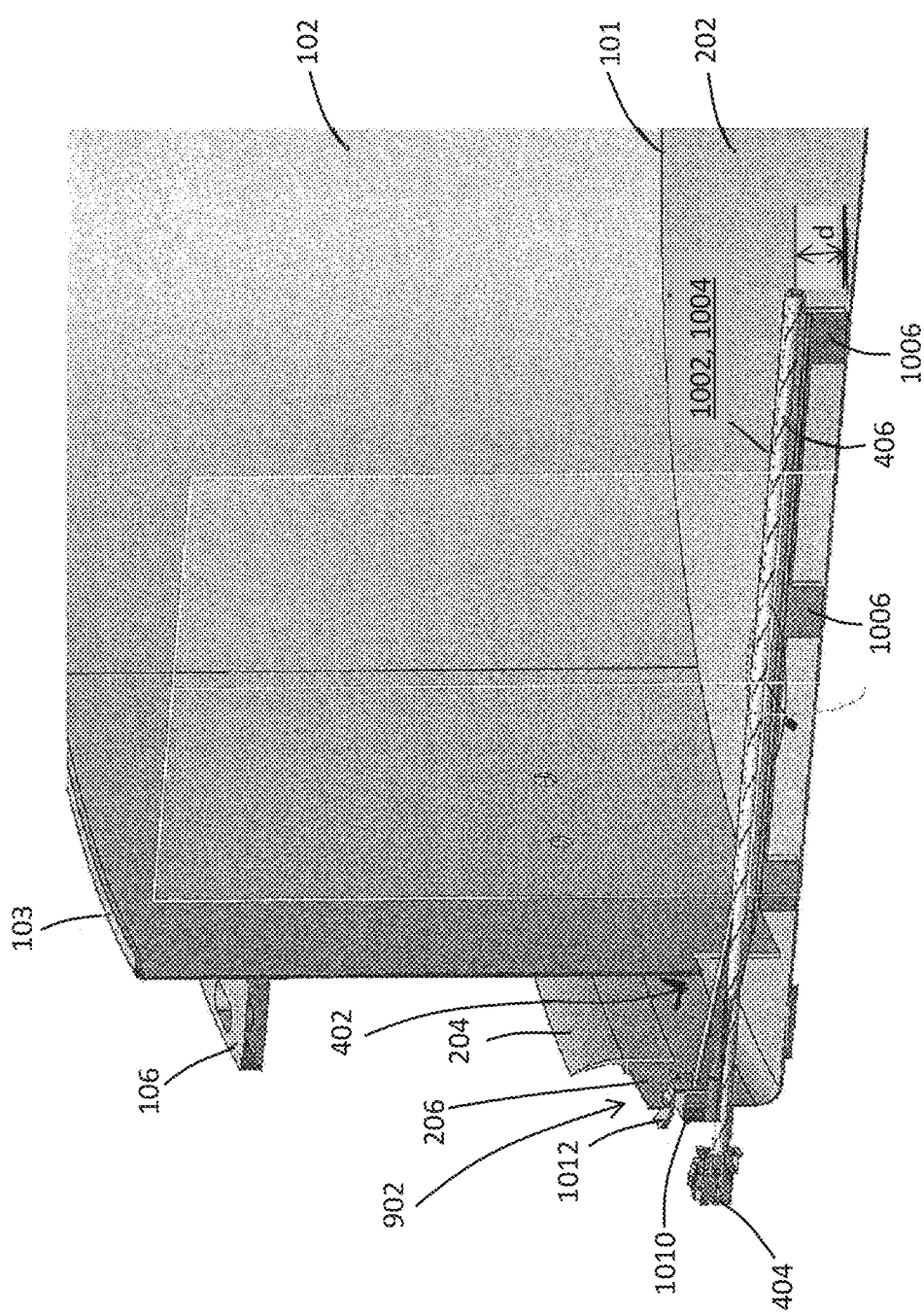
FIG. 13 illustrates an enlarged view of a portion of a cross-section of the support assembly of the water heater with the second example leak sensor assembly along axis B-B' shown in FIG. 9, in accordance with example embodiments of the present disclosure.
Figure 14:
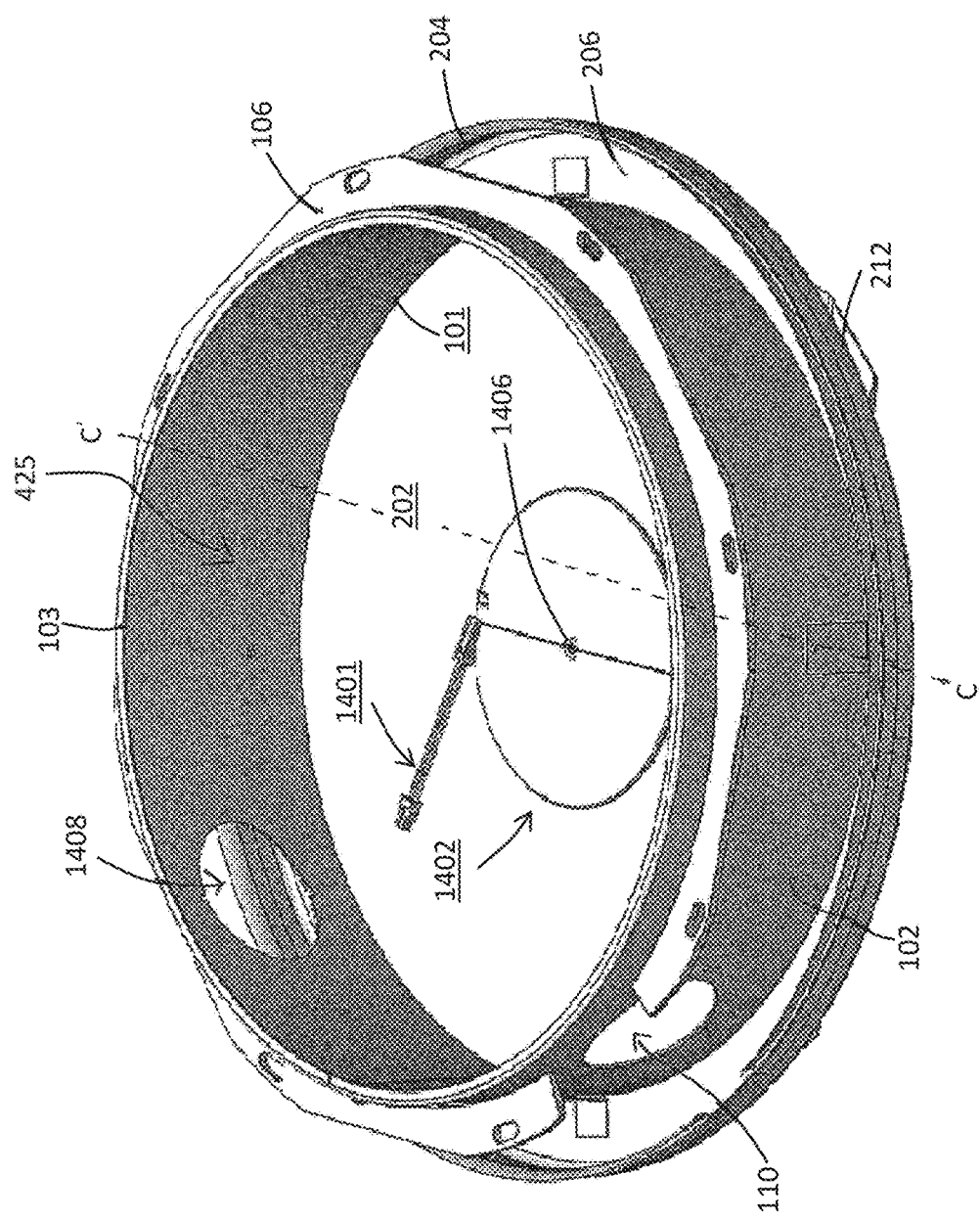
FIG. 14 illustrates a top isometric view of the support assembly of the water heater with a third example leak sensor assembly disposed in the bottom pan of the support assembly, in accordance with example embodiments of the present disclosure.

Furthermore, the sensor housing 1000 of the second leak sensor assembly 908 may include feet 1006 that extend substantially perpendicular to the top surface 1089 of the elongate body 1002 from edges of the sidewalls 1091 of the elongate body 1002. As described above in association with the first leak sensor assembly 408 of FIGS. 4-8, the feet 1006 of the sensor housing 1000 may be configured to elevate the sensor channel 1102 defined by the sensor housing 1000 above the base 202 of the bottom pan 200 by a distance 'd' when the sensor housing 1000 is disposed on the base 202 of the bottom pan 200. The feet 1006 of the sensor housing 1000 may be coupled to the base 202 of the bottom pan 200 using any appropriate coupling mechanisms without departing from a broader scope of the present disclosure. Further, the length of the sensor housing 1000, i.e., the distance between the front 1097 and the rear end 1099 of the sensor housing 1000 may be larger than the radius of the skirt wall 102. Accordingly, a notch 402 may be formed in the skirt wall 102 to provide clearance for the sensor housing 1000 to pass through the skirt wall 102. In particular, as illustrated in FIGS. 9 and 13, the head 904 of the sensor housing 1000 extends out from the skirt wall 102 through the notch 402. Since the slope of the angled portion 1008 of the sensor housing 1000 is not large enough to clear the sidewall 206 and/or the channeling member 204 of the bottom pan 200 by passing above the sidewall 206 and/or the channeling member 204, a notch 902 is formed in the sidewall 206 of the bottom pan 200 such that the head 904 of the sensor housing 1000 can exit the bottom pan 200 via the notch 902. Further, the resilient latching element 1012 may be configured to engage an edge of the sidewall 206 that defines the notch 902 to securely retain and align the sensor housing 1000 in place and to prevent unwanted movement of the sensor housing 1000 during operation of the water heater.

As illustrated in FIG. 13, the leak sensor 1200 may be disposed in the sensor channel 1102 defined by the sensor housing 1000 such that a portion of the sensing segment 406 of the leak sensor 1200 is disposed in the sensor channel 1102 while a remainder portion of the sensing segment 406 extends out from the front end 1098 of the elongate body 1002 and the opening 1104 in the head 904. In particular, the portion of the sensing segment 406 that ends at the connector 404 extends out through the opening 1104 in the front 1097 of the sensor housing 1000. In some examples, the body of the sensor housing 1000 may be flexible such that the leak sensor 1200 can be snapped into the sensor channel 1102 defined by the sensor housing 1000.

Further, as described above, the sensor channel 1102 defined by the sensor housing 1000 and the leak sensor 1200 that is disposed therein are shielded on top and on the sides by the elongate body 1002 and the head 904, while being open at a bottom portion 1195 of the sensor housing 1000. Accordingly, water that accumulates in the bottom pan may contact the leak sensor 1200 via the opening at the bottom portion 1195 of the sensor housing 1000 when the water level rises to the elevation at which the leak sensor 1200 is disposed in the sensor channel 1102.

The path through which the water that leaks from various parts of the water heater reaches the second leak sensor assembly 908 may be substantially similar to the path through which the water that leaks from various parts of the water heater reaches the first leak sensor assembly 408. The description of said path through which the water that leaks from various parts of the water heater reaches the first leak sensor assembly 408, the resulting operations of the water heater, and how the leak sensor is coupled to a controller 2705 of the water heater has been provided above in detail in association with FIGS. 4-8 and will not be repeated herein for the sake of brevity.

Third Example Leak Sensor Assembly

Figure 19:
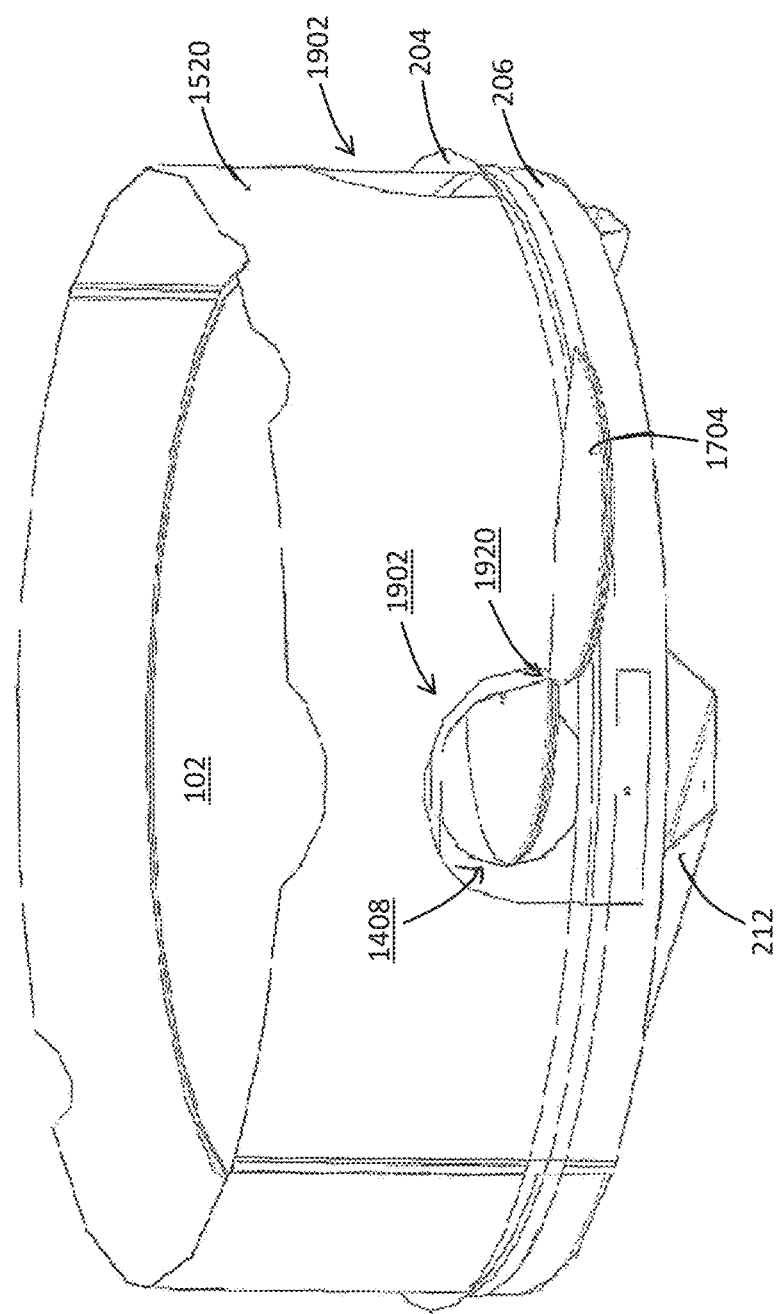
FIG. 19 illustrates how the housing of the third example leak sensor assembly is installed and/or removed from the bottom pan of the water heater, in accordance with example embodiments of the present disclosure.

Turning to FIGS. 14-19, these figures illustrate the third example leak sensor assembly 1402 (herein 'third leak sensor assembly'). As illustrated in FIGS. 14-19, the third leak sensor assembly 1402 may include a sensor housing 1700 and a leak sensor 1200 that is disposed in a sensor channel 1706 defined by the sensor housing 1700. The sensor housing 1700 may include a body 1602 that has a substantially circular disc shaped profile with a through hole 1406 disposed at or near the center of the body 1602. The through hole 1406 may be configured to receive a fastener 1502 therethrough to couple the sensor housing 1700 to the bottom pan 200. In particular, the body 1602 of the sensor housing 1700 may be formed by two halves 1702 and 1704 that are hingedly coupled to each other at one end 1920 such that they can: (a) open as illustrated in FIG. 19 to be inserted into the bottom pan 200 through the exhaust aperture 1902 in the outer jacket 1520 and the exhaust opening (110 or 1408) in the skirt wall 102, and (b) close once they are inserted in the bottom pan 200 beneath the flue gas collector and exhaust pan 108. In other words, the sensor housing 1700 may be divided into halves in order that the assembly may be placed through the exhaust opening 110 or 1408 in the skirt wall 102 and the aperture 1902 in the outer jacket 1520 and be reassembled underneath the flue gas collector and exhaust pan 108. The ability to hingedly open and close the two halves 1702 and 1704 of the sensor housing 1700 allows a sensor housing 1700 having a diameter that is larger than a diameter of the exhaust opening (110 or 1408) in the skirt wall 102 and the aperture 1902 in the outer jacket 1520 to be inserted and installed in the water heater. This in turn allows the diameter of the area of coverage of the sensor housing 1700 of the leak sensor assembly 1402 to be effectively twice the diameter of the openings (110 or 1408, and 1902) in the outer jacket 1520 and the skirt wall 102 through which the sensor housing 1700 must be passed.

As illustrated in FIGS. 15-18, the sensor channel 1706 defined by the sensor housing 1700 may be disposed along a perimeter of the sensor housing 1700 on an outer surface of the sensor housing 1700. In other words, the sensor channel 1706 may be circumferentially disposed around the sensor housing 1700. The sensor housing 1700 may include a sidewall 1809 that extends along the perimeter of the sensor housing 1700. Further, the sensor housing 1700 may include a bottom annular flange 1606 that extends radially outward from a bottom edge of a sidewall 1809, and a top annular flange 1604 that extends radially outward from a top edge of the sidewall 1809 and substantially parallel to the bottom flange 1606. The sensor channel 1706 may be defined by the sidewall 1809 and the two flanges 1604 and 1606 and disposed between two flanges 1604 and 1606 of the sensor housing 1700. In particular, the top annular flange 1604 may be wider and may extend out more than the bottom annular flange 1606. That is, the top annular flange 1604 overhangs or extends beyond the width of the bottom annular flange 1606.

Figure 16:
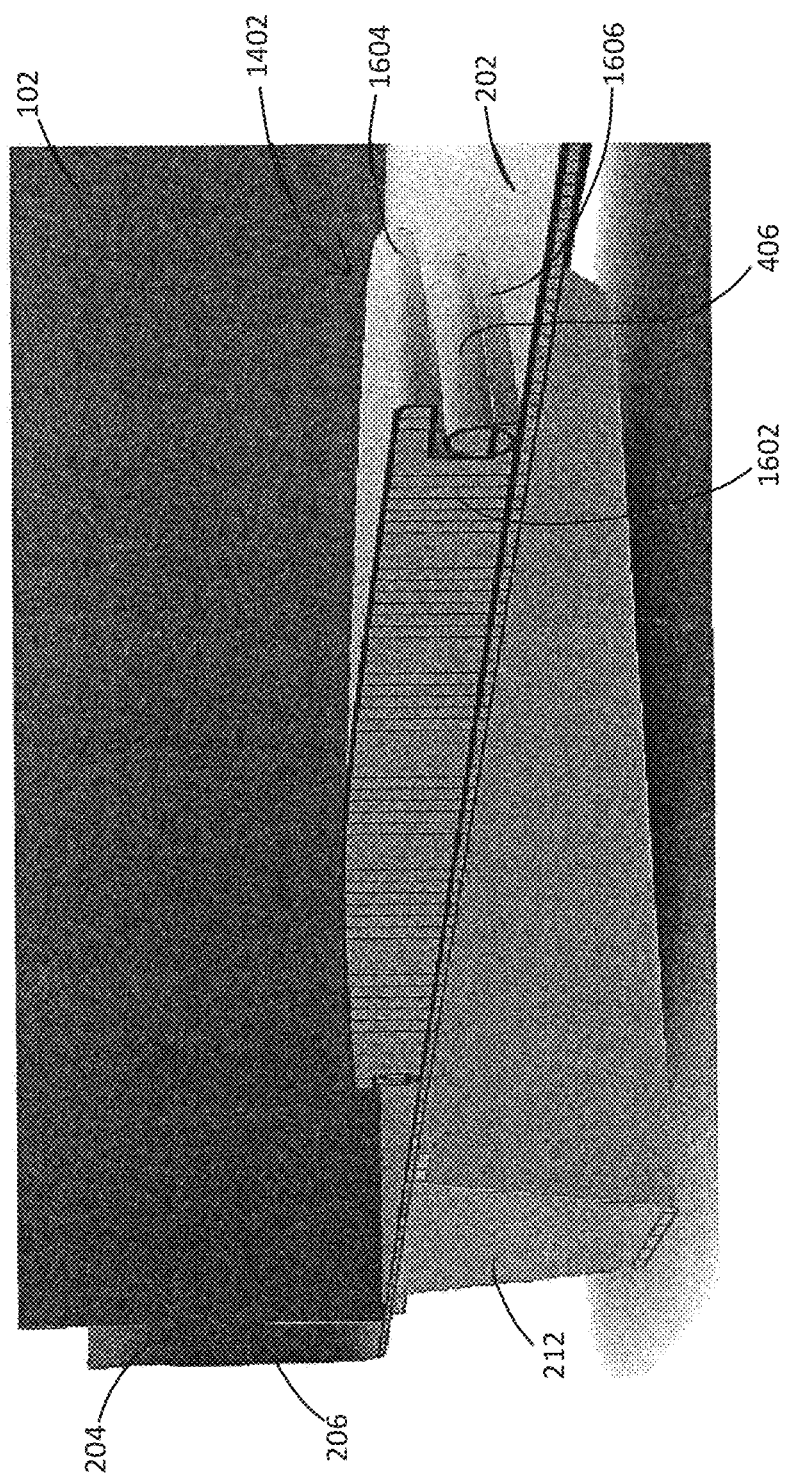
FIG. 16 illustrates an enlarged view of a portion of a cross-section of the support assembly of the water heater with the third example leak sensor assembly along axis C-C' shown in FIG. 14, in accordance with example embodiments of the present disclosure.
Figure 17:
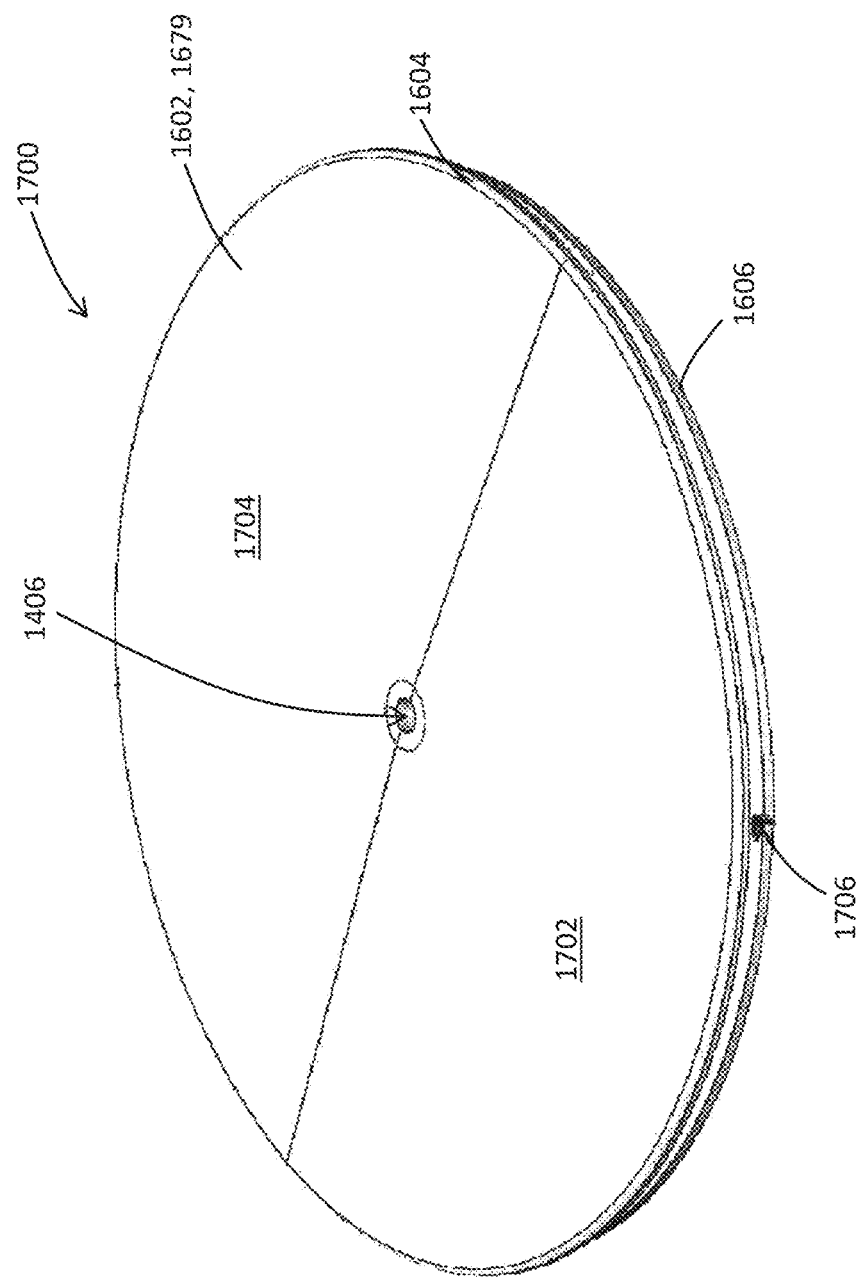
FIG. 17 illustrates a top isometric view of a housing of the third example leak sensor assembly, in accordance with example embodiments of the present disclosure.
Figure 18:
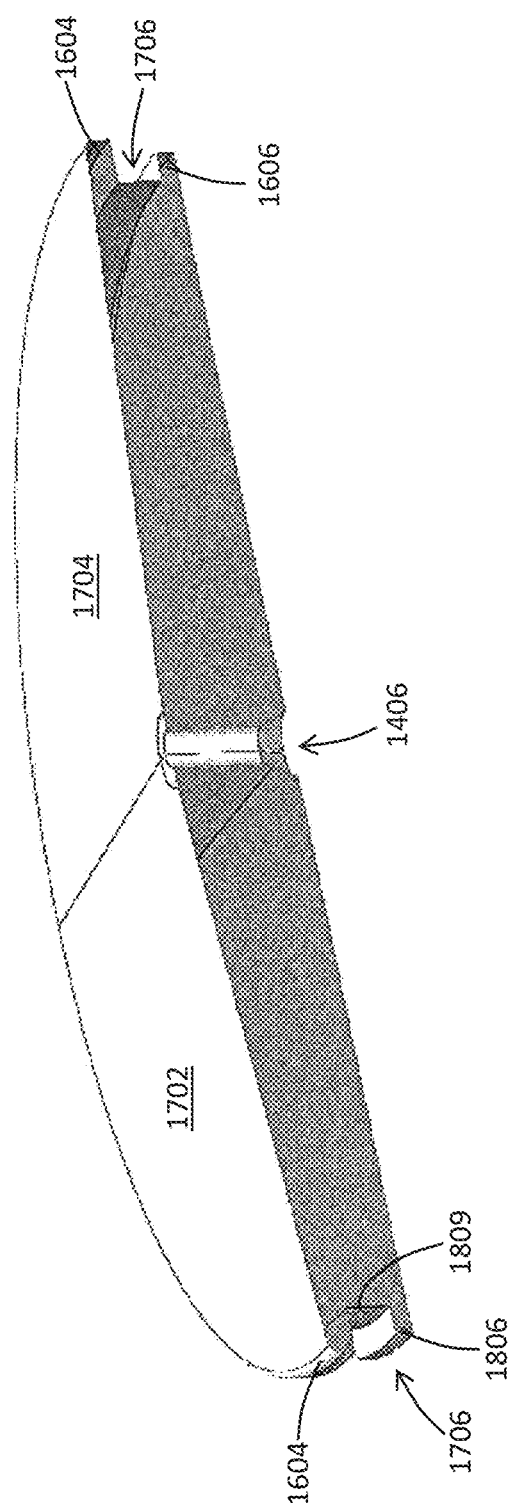
FIG. 18 illustrates a cross-sectional view of the housing of the third example leak sensor assembly, in accordance with example embodiments of the present disclosure.

The overhanging top annular flange 1604 that extends beyond the width of the bottom annular flange 1606 may shield the leak sensor 1200 disposed in the sensor channel 1706 from above. For example, the overhanging top annular flange 1604 may prevent the leak sensor from being triggered by water that drips from above that leak sensor, where the water may not be from a leak condition (e.g., condensation water). Further, the top surface 1679 of the sensor housing 1700 is sloped to prevent water collection on top of the sensor housing 1700. Furthermore, the bottom annular flange 1606 of the sensor housing 1700 may be configured to elevate the sensor channel 1706 and the leak sensor disposed therein above the base 202 of the bottom pan 200 when the sensor housing 1700 is disposed in the bottom pan 200 as illustrated in FIGS. 15 and 16. Accordingly, the water level in the bottom pan 200 must rise above the thickness of the bottom annular flange 1606 to trigger the leak sensor 1700.

As illustrated in FIGS. 14-16 and 19, the leak sensor assembly 1402 may be mounted on the base 202 of the bottom pan 200 within a cavity 425 defined by the skirt wall 102. The leak sensor assembly 1402 may be extended out of the skirt wall 102 and/or the outer jacket 1520 of the water heater either indirectly using extension wiring cables and connectors 1404 or directly using longer leak sensors via the openings (110 or 1408, and 1902) of the skirt wall 102 and/or the outer jacket 1520.

It is noted that since the sensor channel 1706 extends circumferentially around the sensor housing 1700, i.e., along a perimeter of the sensor housing 1700, in some example embodiments, the leak sensor disposed therein may also extend along the perimeter of the sensor housing 1700. However, in other example embodiments, the leak sensor may only extend partially along the perimeter of the sensor housing 1700 without departing from a broader scope of the present disclosure.

The path through which the water that leaks from various parts of the water heater reaches the third leak sensor assembly 1402 may be substantially similar to the path through which the water that leaks from various parts of the water heater reaches the first leak sensor assembly 408. The description of said path through which the water that leaks from various parts of the water heater reaches the first leak sensor assembly 408, the resulting operations of the water heater, and how the leak sensor is coupled to a controller 2705 of the water heater has been provided above in detail in association with FIGS. 4-8 and will not be repeated herein for the sake of brevity.

Even though FIGS. 14-19 illustrate a sensor housing having a substantially circular disc shaped profile, one of ordinary skill in the art can understand and appreciate that in other example embodiments, the sensor housing can have any other appropriate shape without departing from a broader scope of the present disclosure. For example, the sensor housing may have an oval shaped profile as illustrated in FIGS. 20-22 as will be described in greater detail in the following paragraphs.

Fourth Example Leak Sensor Assembly

Turning to FIGS. 20-22, these figures illustrate the fourth example leak sensor assembly 2002 (herein 'fourth leak sensor assembly'). As illustrated in FIGS. 20-22, the fourth leak sensor assembly 2002 may include a sensor housing 2100 and a leak sensor 1200 that is disposed in a sensor channel 2110 defined by the sensor housing 2100. The sensor housing 2100 may include a body 2102 that has a substantially oval shaped profile defined by two long sections 2181 and 2183 that are disposed parallel to each other and two curved sections 2185 joining the ends of the two long sections 2181 and 2183 as illustrated in FIG. 21. Further, the sensor housing 2100 may include a bridge section 2104 that extends between at least a portion of the two long sections 2181 and 2183 and is disposed at or near the middle of the two long sections 2181 and 2183. Furthermore, the sensor housing 2100 may include cross bars 2106 that are disposed between the long sections 2181 and 2183 on either side of the bridge section 2104 to provide added structural support to the sensor housing 2100. The bridge section 2104 may include a through aperture 2108 (or a blind aperture) that may be configured to receive a fastener therethough to couple the sensor housing 2100 to the base 202 of the bottom pan 200. Alternatively, the through aperture 2108 may have other features formed therein that create a press fit which snaps over the threads of a center stud and eliminates the need for a fastener to secure the sensor housing 2100 to the base 202 of the bottom pan 200.

That is, in some example embodiments, the sensor housing 2100 may be coupled to the bottom pan 200 by snap fitting the sensor housing 2100 to a stud in the base 202 of the bottom pan 200.

The sensor housing 2100 may be disposed in the bottom pan 200 underneath the flue gas collector and exhaust pan 108 and within the cavity 425 defined by the skirt wall 102 by inserting the sensor housing 2100 along its length (long sections 2181 and 2183) through the axially aligned exhaust aperture 1902 (shown in FIG. 19) in the outer jacket 1520 and the exhaust opening (110 or 1408) in the skirt wall 102. Once inserted, as described above, the sensor housing 2100 may be coupled or attached to the base 202 of the bottom pan 200 using fasteners, a snap-fit mechanism, or any other appropriate coupling mechanisms without departing from a broader scope of the present disclosure.

As illustrated in FIGS. 21 and 22, the sensor channel 2110 defined by the sensor housing 2100 may be disposed along a perimeter of the sensor housing 2100 on an outer surface of the sensor housing 2100. In other words, the sensor channel 2110 may be circumferentially disposed around the sensor housing 2100. As illustrated in FIG. 22 and substantially similar to the sensor housing 1700 of the third sensor housing described in association with FIGS. 14-19, the sensor channel 2110 of the sensor housing 2100 may be defined by: (i) a sidewall 2202 that extends along the perimeter of the sensor housing 2100, (ii) a bottom annular flange 2114 that extends radially outward from a bottom edge of a sidewall 2202, and (iii) a top annular flange 2112 that extends radially outward from a top edge of the sidewall 2202 and substantially parallel to the bottom flange 2114. That is, the sensor channel 2110 may be formed between two flanges 2112 and 2114 of the sensor housing 2100 along the circumference on the outer surface of the sensor housing 2100. In particular, the top annular flange 2112 may be wider and may extend out more than the bottom annular flange 2114. That is, the top annular flange 2112 overhangs or extends beyond the bottom annular flange 2114.

Similar to the sensor housing 1700 of the third leak sensor assembly 1402 that is described above in association with FIGS. 14-19, the overhanging top annular flange 2112 that extends beyond the length of the bottom annular flange 2114 may shield the leak sensor 1200 disposed in the sensor channel 2110 from above. For example, the overhanging top annular flange 2112 may prevent water from a normal operation of the water heater (e.g., condensation water) that drips on top of the sensor housing from triggering the leak sensor 1200 disposed in the sensor channel 2110. Further, the bottom annular flange 2114 of the sensor housing 2100 may be configured to elevate the sensor channel 2110 and the leak sensor 1200 disposed therein above the base 202 of the bottom pan 200 when the sensor housing 1700 is disposed in the bottom pan 200. Accordingly, the water level in the bottom pan 200 must rise above the thickness of the bottom annular flange 2114 to access or contact the leak sensor 1200 and trigger a leak condition.

The path through which the water that leaks from various parts of the water heater reaches the fourth leak sensor assembly 2002 may be substantially similar to the path through which the water that leaks from various parts of the water heater reaches the first leak sensor assembly 408. The description of said path through which the water that leaks from various parts of the water heater reaches the first leak sensor assembly 408, the resulting operations of the water heater, and how the leak sensor is coupled to a controller 2705 of the water heater has been provided above in detail in association with FIGS. 4-8 and will not be repeated herein for the sake of brevity.

The third leak sensor assembly 1402 and the fourth leak sensor assembly 2002 may not require additional notches, e.g., notches 402 and 902 (shown in FIGS. 4 and 9) to be created in the skirt wall 102 and the bottom pan 200. Instead, the third leak sensor assembly 1402 and the fourth leak sensor assembly 2002 fit within the cavity 425 defined by the skirt wall 102 and can be extended out towards a controller 2705 or a receptacle connected to a controller 2705 via the exhaust openings and apertures (110 or 1408, and 1902) in the skirt wall 102 and the outer jacket 1520 using extension cables (e.g., 1404) or longer leak sensors.

Even though the third leak sensor assembly 1402 and the fourth leak sensor assembly 2002 disclose sensor channels 1706 and 2110 that are formed along the perimeter of the sensor housing on an outer surface of the sensor housing, one of ordinary skill in the art can understand and appreciate that in other example embodiments, leak sensor assemblies having sensor housings where the sensor channel is formed along the perimeter of the sensor housing on an inside surface of the sensor housing may be used to detect leaks without departing from a broader scope of the present disclosure. Such an example leak sensor assembly will be described below in greater detail in association with FIGS. 23 and 24.

Fifth Example Leak Sensor Assembly

Turning to FIGS. 23 and 24, these figures illustrate the fifth example leak sensor assembly 2302 (herein 'fifth leak sensor assembly'). As illustrated in FIGS. 23 and 24, the fifth leak sensor assembly 2302 may include a sensor housing 2304 and a leak sensor (not shown) that is disposed in a sensor channel 2402 formed along a perimeter of the sensor housing 2304 on an inside surface 2404 of the sensor housing 2304. The sensor housing 2304 of the fifth leak sensor assembly 2302 may be disposed on the base 202 of the bottom pan 200 to detect a leak condition in the water heater.

In particular, the sensor housing 2304 may include a top wall 2306 that is substantially circular in shape, and a sidewall 2308 that extends substantially perpendicular to the top wall 2306 from a perimeter of the top wall 2306. The top wall 2306 and the side wall 2308 may define an interior cavity 2406. Further, the sidewall 2308 may include notches 2310 that are formed along the bottom edge 2309 of the sidewall 2308 to allow water that collects in the bottom pan 200 to enter the interior cavity 2406 defined by the sensor housing 2304. Furthermore, the top wall 2306 may include a through aperture 2312 that is formed therein to allow air displaced by the water rising in the interior cavity 2406 to escape through the top of the sensor housing 2304.

As illustrated in FIG. 24, the inside surface 2404 of the sensor housing 2302 may be threaded or may have multiple grooves that define multiple sensor channels 2402 that may be configured to receive a leak sensor therein. The leak sensor that is used in conjunction with the sensor housing 2302 of the fifth leak sensor assembly 2302 may be a tape sensor that may be adhesively coupled to one of the multiple sensor channels 2402. Alternatively a rope sensor 1200 may be attached to the sensor channel 2402 in the inside surface 2404 of the sensor housing 2302 using adhesives. The sensor channels 2402 may be vertically stacked one above the other and the tape sensor may be disposed in any one of the sensor channels 2402 based on a desired level of water detection.

The sensor channels 2402 may be elevated from the base 202 of the bottom pan 200 by different distances when the sensor housing 2302 is disposed in the bottom pan 200. That is, the sensor channel 2402 in which the leak sensor is disposed may determine the elevation to which water accumulated in the bottom pan 200 must rise before the water contacts the leak sensor to trigger the leak sensor. The multiple sensor channels 2402 allow the leak sensor to be disposed at different heights depending on the desired level of water detection. Further, since the leak sensor is disposed on an inside surface 2404 of the sensor housing 2302, the top wall 2306 and the sidewall 2308 protect the leak sensor from water that may drip on the leak sensor from above.

Even though FIGS. 23 and 24 illustrate the sensor housing 2304 of the leak sensor assembly 2302 as being substantially cylindrical in shape, one of ordinary skill in the art can understand and appreciate that the sensor housing of the leak sensor assembly 2302 may have any other appropriate geometric or non-geometric shape without departing from a broader scope of the present disclosure.

Further, it is noted that the water heater may use any one of the example leak sensor assemblies to detect a water leak condition. Furthermore, in one or more example embodiments, the leak sensor assembly may be factory installed in the bottom pan during a manufacturing process of the water heater. However, in other example embodiments, the leak sensor assembly may be configured for installation on site.

Although example embodiments are described herein, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A water heater comprising:
    a bottom pan that comprises:
        a base
        a sidewall disposed along a perimeter of the base; and
    a leak sensor assembly that is configured to detect water that leaks from the water heater, the leak sensor assembly comprising:
        a sensor housing that comprises a sensor channel that is formed therein such that the sensor channel is disposed at an elevation from the base of the bottom pan when the sensor housing is disposed on the base of the bottom pan; and
        a leak sensor that is disposed in the sensor channel of the sensor housing,
        wherein the sensor housing comprises a body that has a disc shaped profile and a through hole formed therein,
        wherein the through hole is configured to receive a fastener therethrough to couple the sensor housing to the bottom pan,
        wherein the body is formed of two halves that are hingedly coupled to each other, and
        wherein the sensor channel extends circumferentially along a perimeter of the body and on an outer surface of the body;
    a shut-off valve that is configured to control a flow of the water into a storage tank of the water heater; and
    a controller that is coupled to the leak sensor and configured to control the shut-off valve,
        wherein responsive to receiving a signal from the leak sensor that the leak sensor has detected water, the controller is configured to:
            close the shut-off valve during a first mode of operation, and
            send a query to a computing device of a user associated with the water heater and close the shut-off valve based on an input from the user during a second mode of operation.

2. The water heater of claim 1, wherein the bottom pan further comprises a channeling member that extends radially outward and away from a top edge of the sidewall, and wherein the channeling member is configured to direct water that leaks from one or more portions of the water heater towards the base of the bottom pan.

3. The water heater of claim 1, wherein the bottom pan of the water heater is configured to receive and support at least a storage tank and an outer jacket of the water heater.

4. The water heater of claim 1:
    wherein the body comprises:
        a body sidewall,
        an annular top flange that extends from a top edge of the body sidewall, and
        an annular bottom flange that extends from a bottom edge of the body sidewall and parallel to the annular top flange,
    wherein the sensor channel is disposed between the annular top flange and the annular bottom flange,
    wherein the annular top flange is wider than the bottom annular flange, and
    wherein a thickness of the annular bottom flange elevates the sensor channel above the base of the bottom pan when the sensor housing is disposed on the base of the bottom flange.

5. A leak detection system comprising:
    a leak sensor assembly that is configured to be disposed in a reservoir associated with a water heater and to detect water that leaks from the water heater and accumulates in the reservoir, the leak sensor assembly comprising:
        a sensor housing that comprises a sensor channel that is formed therein, wherein the sensor housing comprises:
            an elongate member that has a curved body and defines a portion of the sensor channel such that the portion of the sensor channel is disposed at a first elevation from a base of the reservoir when the sensor housing is disposed in the reservoir;
            a head disposed at an end of the elongate member, the head defining a remainder portion of the sensor channel such that the remainder portion of the sensor channel is disposed at a second elevation from the base of the reservoir when the sensor housing is disposed in the reservoir, the second elevation being higher than the first elevation; and
        a leak sensor that is disposed in the sensor channel of the sensor housing and configured to detect the water that leaks from the water heater when the water collected in the reservoir rises to the first elevation at which the leak sensor is disposed in the sensor channel, wherein the head of the sensor housing is configured to extend the leak sensor external to the reservoir.

6. The leak detection system of claim 5, wherein the leak sensor is a rope sensor.

7. A leak detection system comprising:
a leak sensor assembly that is configured to be disposed in a bottom pan of a water heater and to detect water that leaks from the water heater and accumulates in the bottom pan, the leak sensor assembly comprising:
a sensor housing that comprises a sensor channel that is formed therein such that the sensor channel is disposed at an elevation from a base of the bottom pan when the sensor housing is disposed on the base of the bottom pan; and
a leak sensor that is disposed in the sensor channel of the sensor housing,
wherein the sensor housing comprises a body that has a disc shaped profile and a through hole formed therein,
wherein the through hole is configured to receive a fastener therethrough to couple the sensor housing to the bottom pan,
wherein the body is formed of two halves that are hingedly coupled to each other, and
wherein the sensor channel extends circumferentially along a perimeter of the body and on an outer surface of the body.

8. The leak detection system of claim 5:
wherein the sensor housing comprises:
one or more feet members that extend out from a bottom of the elongate member and are configured to dispose the sensor channel at the first elevation from the base of the reservoir when the sensor housing is disposed on the base of the reservoir, and wherein the portion of the sensor channel connects with the remainder portion of the sensor channel through a cavity that is formed in the head, and
wherein the portion of the sensor channel has a cross-sectional profile having a first shape and the remainder portion of the sensor channel has a cross-sectional profile having a second shape.

9. The leak detection system of claim 5:
wherein the head comprises:
a vertical member that extends substantially perpendicular to the elongate member from the end of the elongate member, the vertical member being parallel to one or more feet members that extend out from a bottom of the elongate member;
an angled member that extends upwards and at an obtuse angle to the vertical member from an end of the vertical member; and
a horizontal member that extends substantially parallel to the elongate member from an end of the angled member, the horizontal member being disposed at the second elevation from the base of the reservoir,
wherein the horizontal member comprises snap tabs that are configured to receive and securely retain a portion of the leak sensor that is disposed in the remainder portion of the sensor housing defined by the head, and
wherein the cavity that connects the portion of the sensor channel to the remainder portion of the sensor channel is formed in the vertical member of the head.

10. The leak detection system of claim 9, wherein a slope of the angled member allows the head of the sensor housing to clear a sidewall of the reservoir by passing above the sidewall.

11. The leak detection system of claim 5, wherein the curved body of the elongate member and the head are configured to prevent triggering of the leak sensor by water that drips on a top portion of the sensor housing from a normal operation of the water heater.

12. The leak detection system of claim 7:
wherein the body of the sensor housing comprises:
a sidewall,
an annular top flange that extends from a top edge of the sidewall, and
an annular bottom flange that extends from a bottom edge of the sidewall and parallel to the annular top flange,
wherein the sensor channel is disposed between the annular top flange and the annular bottom flange,
wherein the annular top flange is wider than the annular bottom flange, and
wherein a thickness of the annular bottom flange elevates the sensor channel above the base of the bottom pan when the sensor housing is disposed on the base of the bottom flange.

13. The leak detection system of claim 7, wherein a top surface of the body is sloped to prevent water from collecting on top of the sensor housing.

14. The water heater of claim 1, wherein a top surface of the body is sloped to prevent water from collecting on top of the sensor housing.

* * * * *